(12) United States Patent
Nicolai

(10) Patent No.: US 7,644,944 B2
(45) Date of Patent: Jan. 12, 2010

(54) MULTIPLE GEAR TRANSMISSION FOR A BICYCLE

(76) Inventor: Karlheinz Nicolai, Kuelftalstrasse 18, D-31093, Luebbrechtsen (DE)

( * ) Notice: Subject to any disclaimer, the term of this patent is extended or adjusted under 35 U.S.C. 154(b) by 482 days.

(21) Appl. No.: 11/569,160

(22) PCT Filed: Sep. 9, 2005

(86) PCT No.: PCT/DE2005/001580

§ 371 (c)(1), (2), (4) Date: Mar. 1, 2007

(87) PCT Pub. No.: WO2006/039880

PCT Pub. Date: Apr. 20, 2006

(65) Prior Publication Data

US 2007/0210552 A1 Sep. 13, 2007

(30) Foreign Application Priority Data

Sep. 15, 2004 (DE) ........................ 10 2004 045 364

(51) Int. Cl.
*B62M 1/00* (2006.01)
(52) U.S. Cl. ........................ 280/257; 280/238; 280/260
(58) Field of Classification Search ................. 280/257, 280/238, 260
See application file for complete search history.

(56) References Cited

U.S. PATENT DOCUMENTS

| 628,839 | A |   | 7/1899 | Newsom |   |
|---|---|---|---|---|---|
| 1,089,483 | A |   | 3/1914 | Laffond |   |
| 2,061,225 | A |   | 11/1936 | Duvall |   |
| 2,431,982 | A | * | 12/1947 | Barnett | ........................ 74/331 |
| 3,209,609 | A | * | 10/1965 | Kirschmann | ................. 74/349 |
| 4,823,641 | A | * | 4/1989 | Kuhn et al. | .................. 475/277 |

(Continued)

FOREIGN PATENT DOCUMENTS

CH        185555         7/1936

(Continued)

OTHER PUBLICATIONS

PCT International Search Report of the International Searching Authority dated Nov. 30, 2005 for PCT/DE2005/001580.

(Continued)

*Primary Examiner*—Kevin Hurley
*Assistant Examiner*—Tashiana Adams
(74) *Attorney, Agent, or Firm*—Greenblum & Bernstein, P.L.C.

(57) ABSTRACT

A multiple gear transmission for a bicycle with an input shaft and an output shaft supported in a transmission housing, whereby the input shaft is embodied to receive pedal cranks and both ends of the input shaft protrude from the transmission housing. One of the ends of the output shaft protrudes from the transmission housing and the output shaft is embodied at this end to receive a drive sprocket. At least one intermediate shaft is supported in the transmission housing parallel between the input shaft and the output shaft. Respectively, at least two gear wheels are arranged on the input shaft, the at least one intermediate shaft and the output shaft. The gear wheels arranged on at least two of the shafts can be connected in a torque-proof manner to the respective shaft via clutch mechanism. All the gear wheels are permanently meshed with another gear wheel.

36 Claims, 19 Drawing Sheets

U.S. PATENT DOCUMENTS

| | | | |
|---|---|---|---|
| 5,142,937 A | 9/1992 | Takahara et al. | |
| 5,261,294 A | 11/1993 | Ticer et al. | |
| 5,517,873 A * | 5/1996 | Gordon | 74/325 |
| 5,553,510 A | 9/1996 | Balhorn | |
| 5,975,266 A | 11/1999 | Balhorn | |
| 6,318,198 B1 * | 11/2001 | Gordon | 74/341 |
| 6,325,400 B1 * | 12/2001 | Lai | 280/253 |
| 7,294,076 B2 * | 11/2007 | Matsumoto et al. | 474/78 |
| 2003/0213318 A1 | 11/2003 | Matsumoto et al. | |
| 2006/0175795 A1 * | 8/2006 | Corson | 280/260 |

FOREIGN PATENT DOCUMENTS

| | | |
|---|---|---|
| DE | 1886791 | 1/1964 |
| DE | 2739908 | 3/1978 |
| DE | 1 9505029 | 8/1996 |
| DE | 1 9750659 | 5/1999 |
| DE | 2 0201787 | 6/2002 |
| DE | 142442 | 7/2003 |
| DE | 6 9722018 | 2/2004 |
| DE | 1 0339207 | 6/2005 |
| DE | 10 2004 045364 | 8/2006 |
| EP | 0930223 | 7/1999 |
| FR | 737137 | 12/1932 |
| FR | 834702 | 11/1938 |
| WO | 9906269 | 11/1999 |

OTHER PUBLICATIONS

English Language Translation of Written Notice of PCT International Search Report of the International Searching Authority dated Nov. 30, 2005 for PCT/DE2005/001580.

* cited by examiner

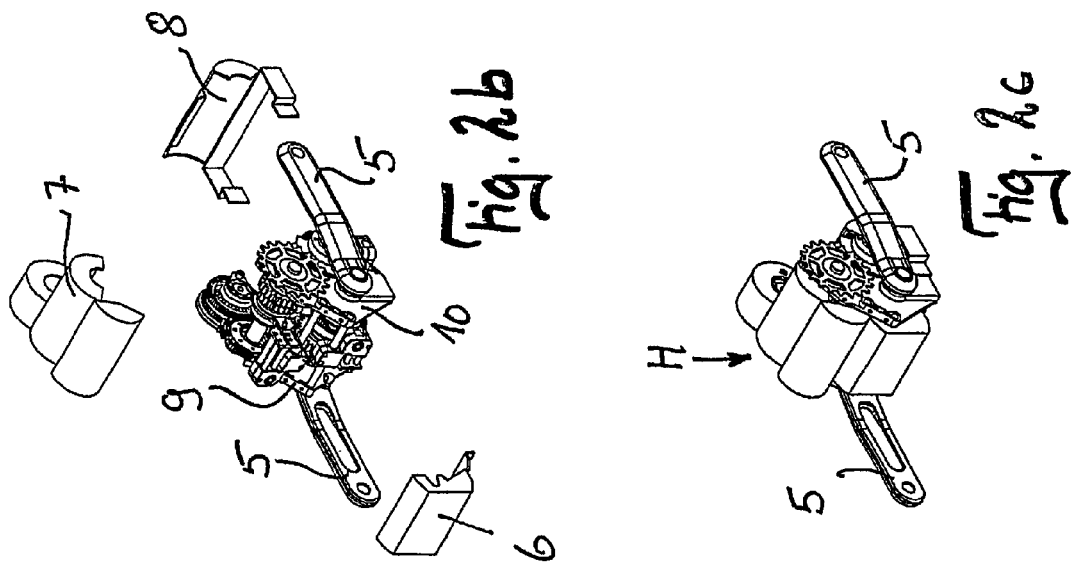
Fig. 2b
Fig. 2c
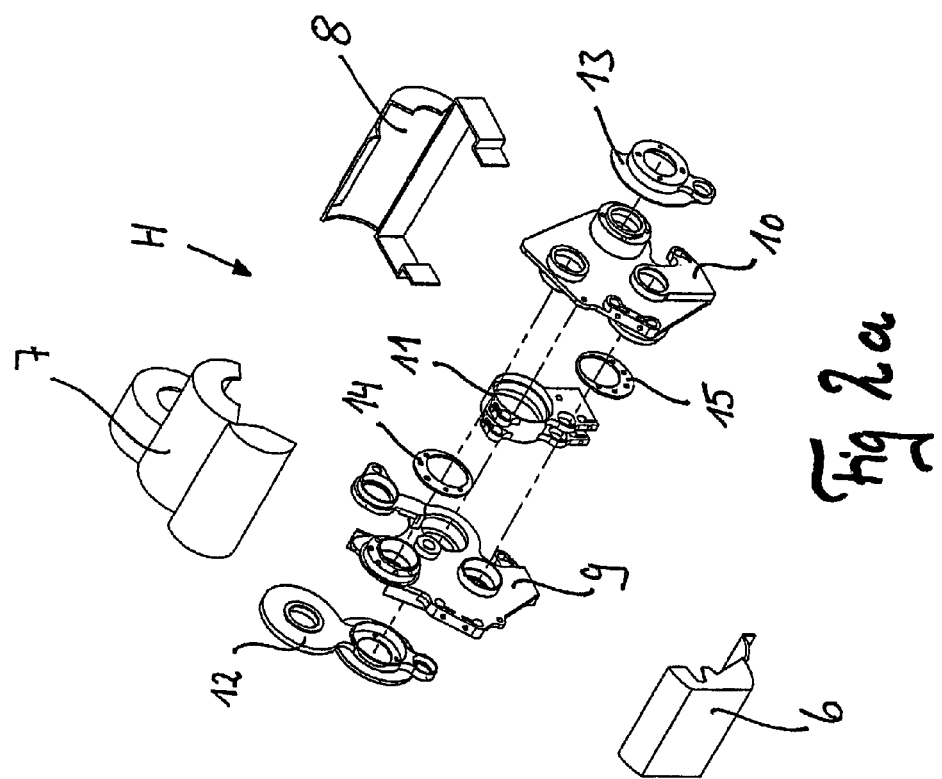
Fig. 2a

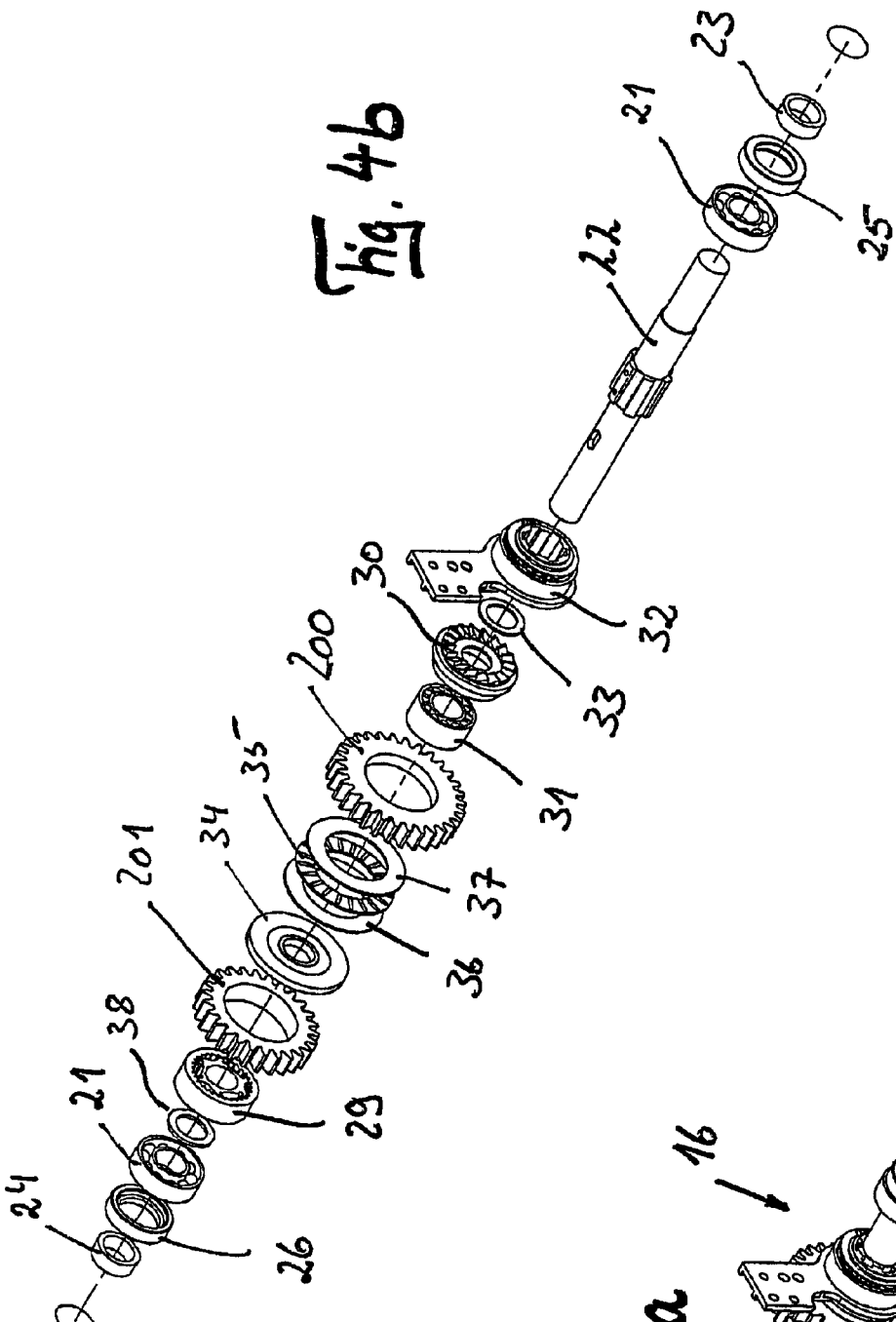
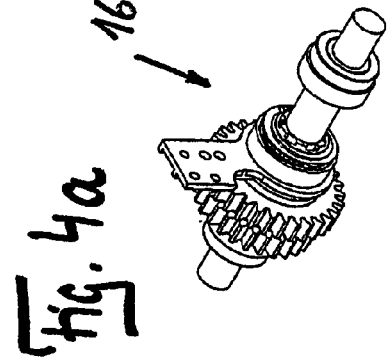

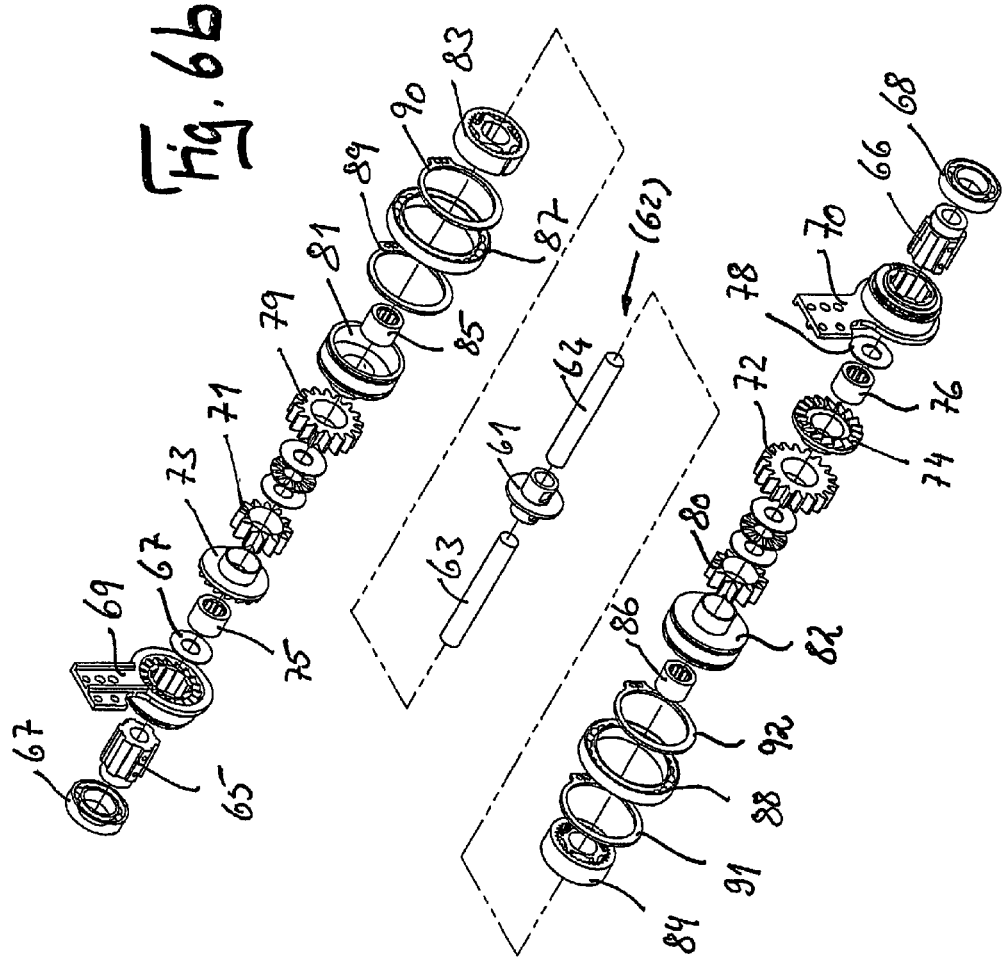

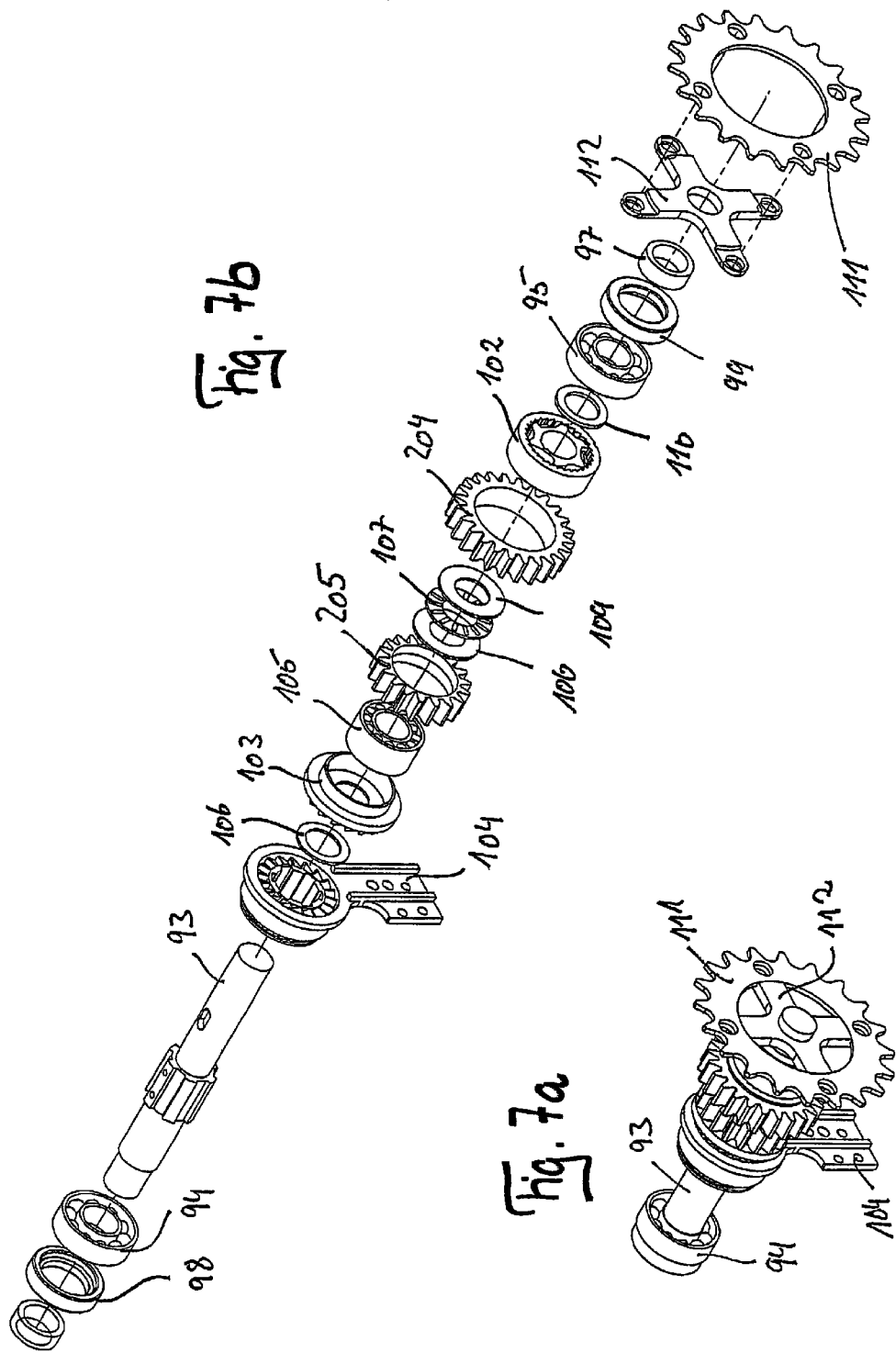

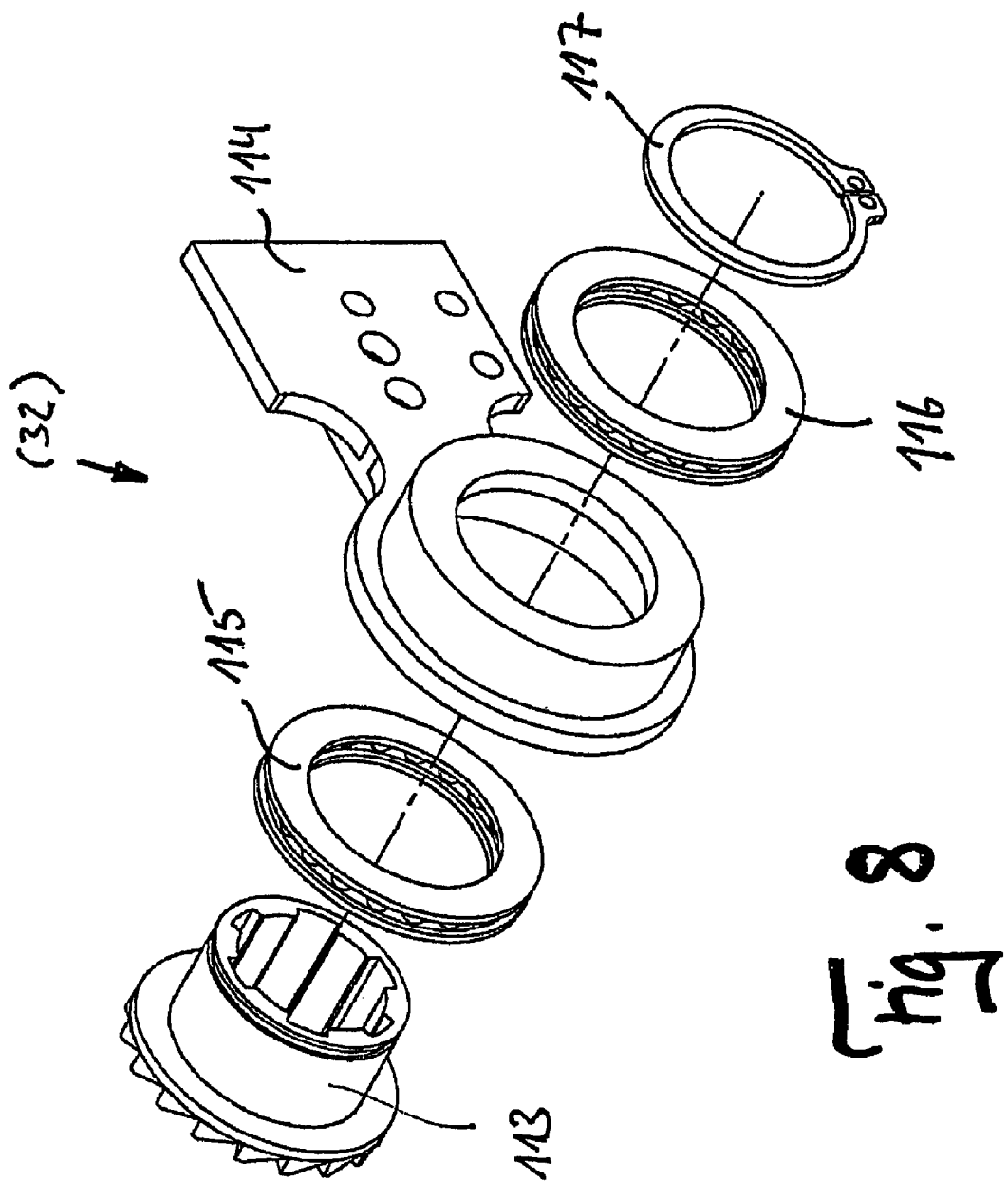

MULTIPLE GEAR TRANSMISSION FOR A BICYCLE

BACKGROUND OF THE INVENTION

1. Field of the Invention

The invention relates to a multiple gear transmission for a bicycle with an input shaft and an output shaft supported in a transmission housing, whereby the input shaft is embodied to receive pedal cranks and both ends of the input shaft protrude from the transmission housing, and one of the ends of the output shaft protrudes from the transmission housing and the output shaft is embodied at this end to receive a drive sprocket.

2. Discussion of Background Information

A transmission of this type is known, e.g., from U.S. Pat. No. 5,553,510. Gear wheels are arranged on both shafts, which gear wheels can be respectively connected to the respective shaft in a torque-proof manner via a freewheel. Pivotable connector sprockets are provided for shifting the transmission, which sprockets can mesh respectively with two gear wheels lying opposite. A transmission of this type is not only designed in a very complex manner in terms of construction, but it is also very susceptible to faults, since it is not ensured that the gear wheels are stationary when the clutch wheel is engaged. Loud shifting noises are inevitable.

In the past forty years the chain drive with a shifting capability at the rear axle has become widely used with bicycles. To this end, a rotatable bottom bracket with one or more chain rings is mounted onto the frame which forms the load-bearing component of the bicycle with all its receiving points for the front wheel fork, the seat post and the rear wheel. A cassette comprising up to ten sprockets of different sizes is located on the hub of the rear wheel. At one drop-out located directly at the rear axle a rear derailleur is installed, which has the task of guiding the chain in the sprockets of the cassette and to render possible shifting processes. Through a derailer that is usually installed at the seat tube it is possible to switch between the various chain rings at the bottom bracket. The capability of shifting allows the rider to adapt the gear ratio of his/her drive to the respective riding situation. Bicycles with a shifting system as described above are generally referred to as bicycles with derailleur gears.

As the components are mounted outside on the frame for constructional reasons with a bicycle with derailleur gears, the components are particularly strongly exposed to environmental influences. Dirt and water thus come into contact with rear derailleur, chain, cassette and other components in an unobstructed manner. This drastically reduces the efficiency of derailleur gears, which is initially very good, so that a considerable part of the force must be used to overcome the resistances within the shifting system. In order to ensure functionality it is necessary to regularly service the components of the derailleur gears, which includes cleaning and greasing the components and adjusting them precisely. This adjustment can easily change, e.g., with falls or contact with objects (stones, branches, etc.). As tiny dirt particles always remain in the shifting system and in particular in the bearings even with the most intensive servicing, some parts need to be replaced regularly. In particular the parts susceptible to wear, such as chain rings and chain require an annual replacement, which in turn incurs additional expenses. Furthermore, components can be damaged or torn off the frame with a fall or contact with stones or branches.

Alternatively to the "derailleur gears" the so-called "integral rear hub" was developed, in which the shifting processes take place in a transmission in the rear wheel hub. The parts required with the derailleur gears; rear derailleur, derailer and cassette are thus omitted. Bicycles of this type are generally called bicycles with integral rear hub. An integral rear hub thus avoids the disadvantages of derailleur gears. Because of the transmission integrated into the rear wheel hub, however, the weight of the rear wheel increases. In particular with so-called mountain bikes, which are moved off-road, an increase in mass at the rear wheel becomes highly noticeable. This applies in particular to bicycles with rear wheel suspension. The ratio of sprung to unsprung mass is of decisive importance for the riding behavior of a sprung wheel. The larger the unsprung mass is in relation to the sprung mass, the more critical is the riding behavior of the wheel. With high unsprung mass (heavy rear wheel) thrusts caused by road bumps cannot be compensated for in an optimum manner by the chassis.

With a known bicycle (cf. DE 103 39 207) the transmission is located within the bicycle frame. The bottom bracket shell of the classic bicycle frame is omitted and replaced by a transmission housing. This is a joint housing for transmission and bottom bracket. Similar to the bicycles with transmission hub, the power is transmitted to the rear wheel via a chain or a toothed belt, the chain and the rear wheel hub do not have a shifting function with this system. The rear wheel hub can thus be built in a very light manner, which results in a more efficient rear wheel suspension. Furthermore, the center of gravity shifts to the center of the wheel, directly below the rider, which results in a more agile and controlled riding behavior. In addition, the so-called "platform strategy" can be used with the aid of the transmission integrated into the frame. Whereas it has hitherto been customary in bicycle construction to first build a frame and then subsequently to equip it with its components, the concept of the transmission integrated into the frame renders it possible to use the platform strategy known from automobile construction in bicycle production. For example components, such as shifting system, suspension, the complete power transmission, but also brakes, generator and lighting are firmly installed in the transmission housing as a platform. The customer-specific parts, which complete the bicycle according to customer specification, are then mounted to the transmission thus equipped. The transmission comprises a planetary transmission and a primary drive. The primary drive is necessary because the planetary transmission developed for the use in a transmission hub does not withstand the high torques acting in the bottom bracket. The primary drive brings the planetary transmission to a higher rotational speed, so that it can withstand the acting forces. This construction, however, lowers the efficiency of the drive.

Based on these problems, the multiple gear transmission described at the outset is to be improved.

SUMMARY OF THE INVENTION

To solve the problem, the generic multiple gear transmission is characterized by the following features:

a) At least one intermediate shaft (45) is supported in the transmission housing (H) parallel between the input shaft (22) and the output shaft (93), b) Respectively at least two gear wheels (200, 201; 202, 203) are arranged on the input shaft (22), the at least one intermediate shaft (44, 45, 62) and the output shaft (93), c) The gear wheels (200, 201; 204, 205) arranged on at least two of the shafts (22, 93) can be connected in a torque-proof manner to the respective shaft (22, 93) via clutch means (29, 32; 102, 104), d) All the gear wheels (200, 201; 202, 203; 204, 205) are permanently meshed with another gear wheel.

Because all the gear wheels are permanently connected to another gear wheel and to the respective shaft, and a gear wheel is always connected in a torque-proof manner to the input shaft and the output shaft, it is impossible for the transmission to be accidentally shifted to a neutral position through a shifting error, which completely rules out injuries to the rider that can result from suddenly pedaling "into a void." Since no gear wheels need to be displaced for changing gears, not only are shifting noises ruled out, but also damage to the teeth.

The clutch means can be freewheels and/or shifting clutches that can be controlled from outside.

Preferably, respectively one of the gear wheels can be connected in a torque-proof manner to the respective shaft by means of a freewheel, and the respectively other one of the gear wheels by means of a shiftable clutch. This ensures that both the input shaft and the output shaft are connected to a gear wheel in a non-positive manner.

If the gear wheels on the input shaft and the gear wheels on the output shaft can be connected to these shafts in a torque-proof manner, the gear wheels arranged on the intermediate shaft can be connected to it in a fixed (rigid) manner, which reduces the production costs.

Several parallel intermediate shafts can be supported in the transmission housing if a plurality of gears and/or a lowest possible grading of the transmission is desired.

In order to keep the weight of the multiple gear transmission as low as possible, the shafts are embodied in a hollow manner. The gear wheels can be perforated to reduce weight.

The shiftable clutch preferably features an internal toothing and a spur gearing, through which the torque-proof connection between the shaft and the associated gear wheel is produced.

The clutch can be arranged on the shaft in an axially displaceable manner. Preferably it is connected to two bearings acting in an axial manner, and the bearings are fixed or connected to a selector finger via a spring. The selector finger can be permanently in contact with a shifting gate and be supported in a rotatable manner.

Preferably the selector finger is guided in the axial direction as well.

To simplify the structure, the shifting gate of the clutch is arranged on a rotatable, rotationally symmetrical shifting gate body. The shifting gate body has elevations and recesses on its front surface or its circumferential surface. Preferably the rotational axis of the shifting gate body runs parallel or at a right angle to the rotational axes of the shafts.

Several shifting gates can be connected to one another in a rotatable manner, whereby the connection can be made via gear wheels. The shifting gates can thus be simultaneously connected to more than one clutch and carry out several axial movements at the same time.

The position of the selector finger with respect to the clutch is preferably variable. The shifting gate body is supported in a rotatable manner at or in the transmission.

If A represents the number of shafts, then at least A+1 gear wheels have a spur gearing. The spur gearing is preferably sawtooth-shaped in contoured section.

At least two shafts have an external toothing, onto which the component parts can be slid.

It is advantageous if the clutch is always held in an axial state via a spring. To reduce friction and improve guidance, the axial movement of the selector finger is preferably guided via a linear ball bearing.

The gear wheels can preferably be embodied in several parts, whereby annular spur gearings can be affixed to the base body.

In order to prevent destruction, an overload protection is preferably arranged in the transmission before the drive sprocket.

A particularly compact structural shape of the transmission is possible if the rotational axes of the shafts lie in at least two different planes.

In one embodiment at least two gear wheels have the same rotational axis and are always connected to one another.

If several shifting gate bodies are provided, their rotational movement is preferably controlled via a separate connecting shaft. The rotational angle position of several shifting gate bodies to one another can preferably be adjusted via clamping components.

BRIEF DESCRIPTION OF THE DRAWINGS

Exemplary embodiments of the invention are explained in more detail below by the following drawings:

FIG. 2a shows parts of the multiple gear transmission in exploded view;

FIG. 2b shows an assembled transmission with the transmission housing in exploded view;

FIG. 2c shows a multiple gear transmission in its housing in perspective view;

FIG. 4a shows a bottom bracket shaft assembly in perspective view;

FIG. 4b shows a bottom bracket shaft assembly in exploded view;

FIG. 6a shows a connecting shaft assembly in perspective view;

FIG. 6b shows a connecting shaft assembly in exploded view;

FIG. 7a shows a drive shaft assembly in perspective view;

FIG. 7b shows a drive shaft assembly in exploded view;

FIG. 8 shows a clutch assembly in exploded view;

DETAILED DESCRIPTION OF THE PRESENT INVENTION

Figure 1:
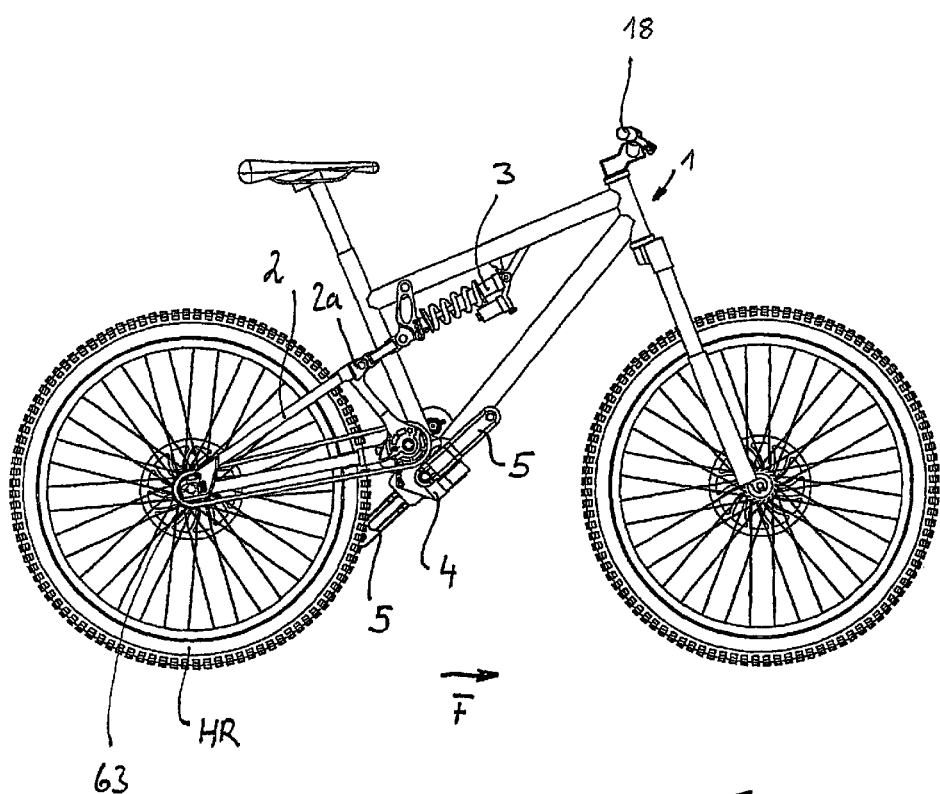
FIG. 1 shows a bicycle with a multiple gear transmission integrated into the frame.

FIG. 1 shows the side view of a bicycle, into the frame 1 of which the multiple gear transmission 4 is integrated with the pedal cranks 5. A rear wheel swing arm 2 is arranged on the frame 1 via a joint 2a and a spring-damper element 3. The transmission is accommodated in a multi-part housing H, which has—as FIG. 2a shows—load-bearing housing parts 9, 10, 11, 12, 13 with the function of supporting the bearings and determining the position of the shafts and axes of the transmission, which housing is composed of covers 6, 7, 8 that cover the housing H towards the outside. Screw covers 14, 15 are provided to fasten the bearings of the transmission shafts. The transmission H is connected to the frame 1 via the covers 7, 8. If the housing H is closed and sealed completely, it can be filled with oil to minimize friction.

Figure 18:
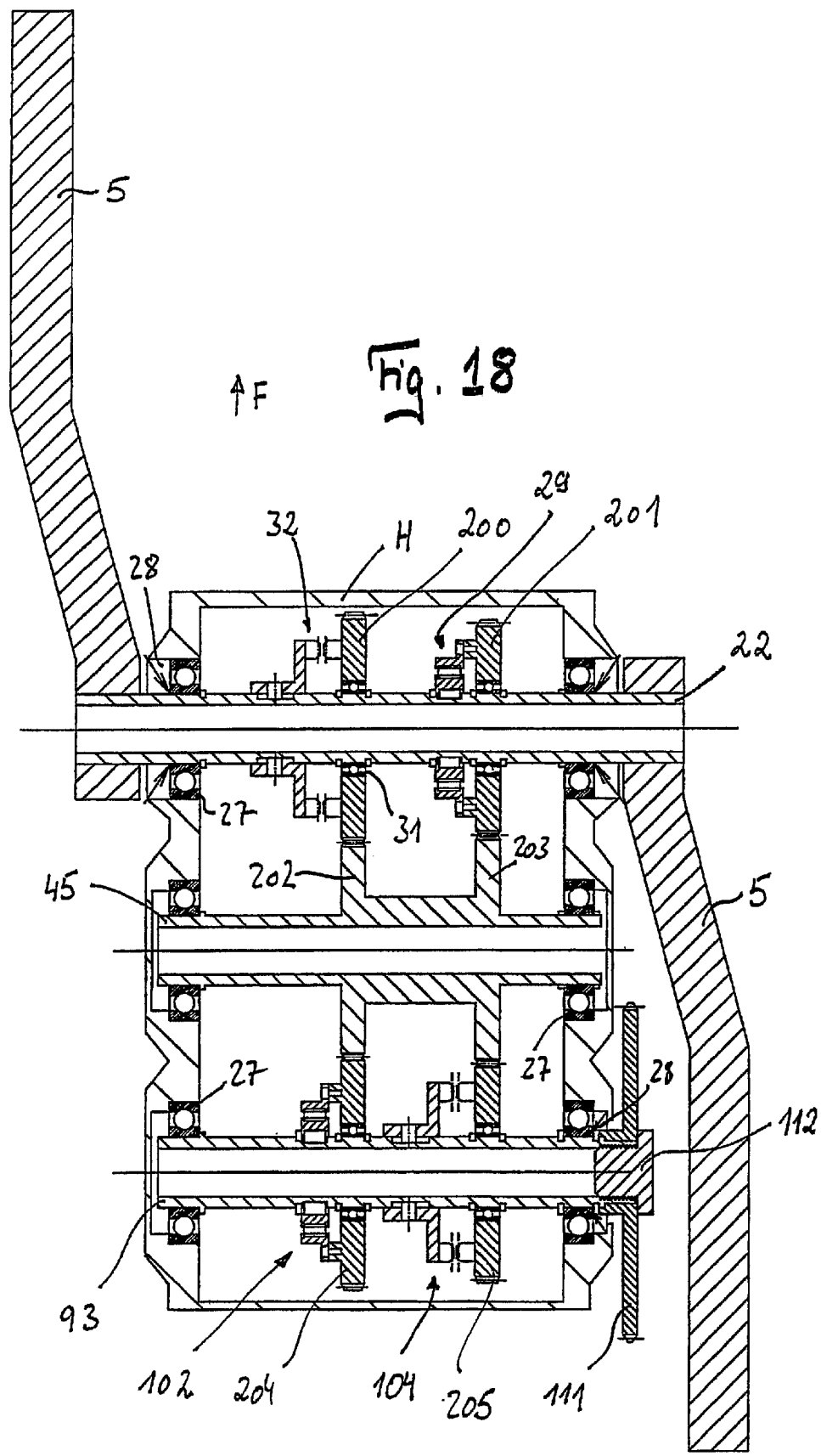
FIG. 18 shows a concept sketch of a 4-gear transmission in section.
Figure 19:
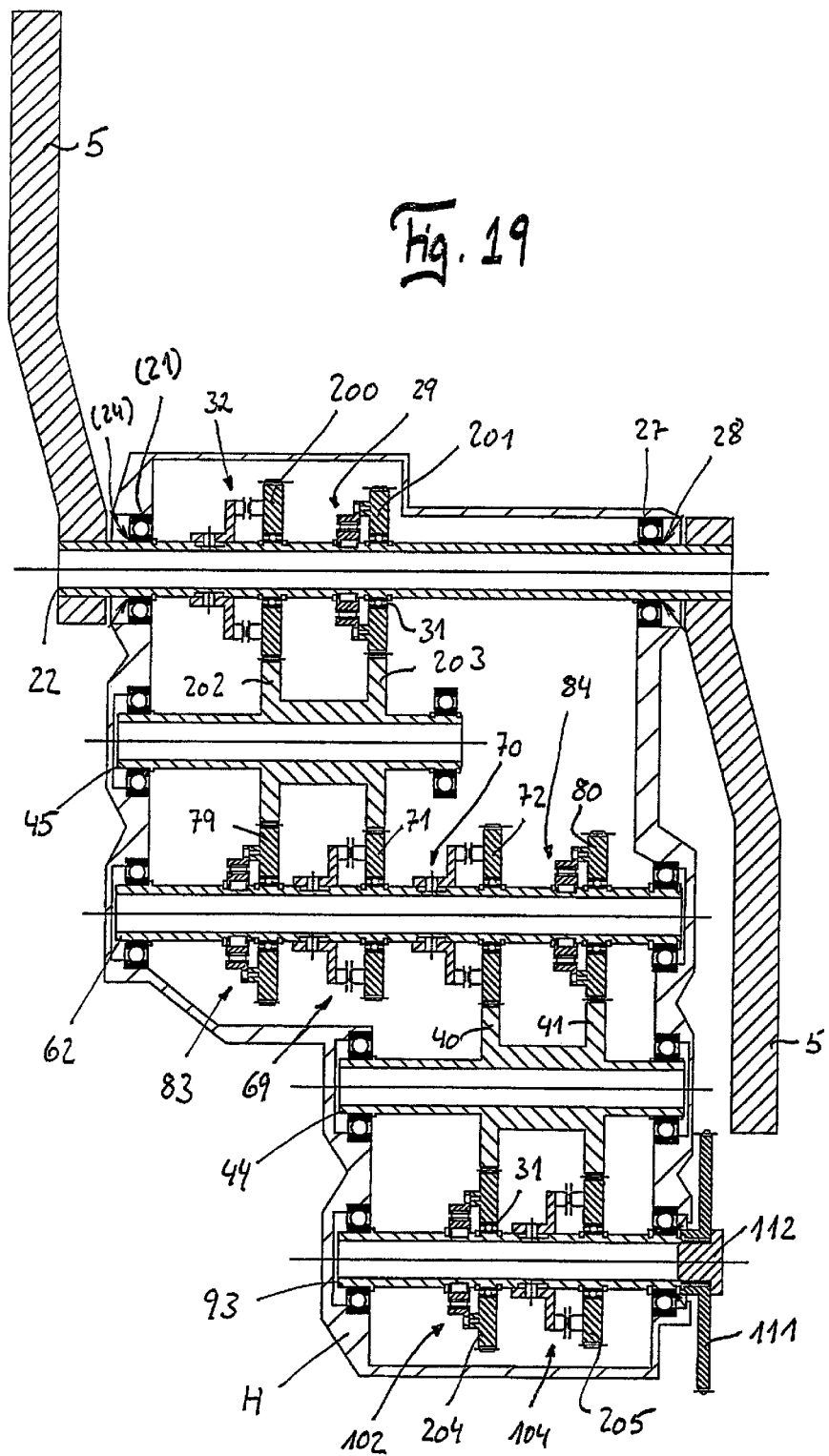
FIG. 19 shows a concept sketch of a 15-gear transmission in section.

On the basis of FIGS. 18 and 19 the mode of operation of the transmission is explained first, before the structure of the transmission is described in detail.

The 4-gear transmission is composed of the input shaft 22, the intermediate shaft 45 and the output shaft 93 provided with a drive sprocket 111. The drive sprocket 111 is fastened to the output shaft 93 via a sprocket holder 112. The input shaft 22 protrudes from the housing H on both sides and is provided with pedal cranks 5 at its ends. The drive shaft 22 has two gear wheels 200, 201, and the output shaft 93 has two gear wheels 204, 205. The intermediate shaft 45 is in one piece and provided with two gear wheels 202, 203. The shafts 22, 45, 93 are supported in the housing H via roller bearings 27.

The torque introduced via the pedal cranks 5 is transmitted from the input shaft 22 via an intermediate shaft 45 to the output shaft 93. From the output shaft 93 the torque is transmitted to the rear wheel HR via a drive sprocket 111 and a chain (not shown here).

The torque is transmitted between the shafts 42, 43, 45 via the gear wheels 200, 201, the gear wheels 202, 203 fixedly connected to one another, and the gear wheels 204, 205. The transmission is shifted via two clutches 32, 104 that can be controlled from outside and two freewheels 29, 102. The clutch 32 and the freewheel 29 interact with the gear wheels 200, 201 supported in a rotatable manner on the input shaft 22, and the clutch 104 and the freewheel 102 interact with the gear wheels 204, 205 arranged in a rotatable manner on the output shaft 93. In order to keep friction to a minimum when the gear wheels 200, 201, 204, 205 are not shifted in a torque-proof manner with respect to the shaft 22, 93, they are preferably supported via ball bearings or needle roller bearings. In the axial direction the gear wheels 200, 201, 204, 205 are safeguarded against displacement. The gear wheels 200 and 205 can be connected in a torque-proof manner to the input shaft 22 or the output shaft 93 via the clutches 32 and 104. The gear wheels 201 and 204 are connected in a torque-proof manner to the input shaft 22 or the output shaft 93 via the freewheels 29 and 202. The external parts of the freewheels 29, 102 are connected to the gear wheels 201, 204, and the internal parts to the shafts 22, 93. If the gear wheels 201, 204 turn more quickly in the same direction as the shaft 22, 93, the freewheel turns freely and without load during a torque transmission from the shaft 22, 93 to the respective gear wheel 201, 204. During a torque transmission from the gear wheel 201, 204 to the shaft 22, 93 the freewheels 29, 102 run freely if the gear wheel 201, 102 turns more slowly than the shaft 22, 93. The freewheels 29, 102 are fastened to the shafts 22, 93 by means of impeller keys or a toothing.

In order to ensure a parallel arrangement of the shafts 22, 45, 93, the sum of the teeth of two opposite gear wheels meshing with one another of two shafts must always be equal. Furthermore, the gear wheels 200, 201, 202, 203, 204, 205 must be selected such that the grading of the individual gears is as even as possible. In the exemplary arrangement of the transmission, the gear wheels 200, 201 with 36 and 30 teeth are on the input shaft 22, the gear wheels 202, 203 with 30 and 36 teeth are on the intermediate shaft 45 and the gear wheels 204, 205 with 17 and 11 teeth are on the output shaft. The determination which of the gear wheels of a shaft 22, 93 is coupled in a torque-proof manner to a shaft 22, 93 via a clutch 32, 104 or a freewheel 29, 102 depends on the rotational speed difference of the gear wheels on a shaft and the direction of the torque transmission, i.e., whether the torque is transmitted from the gear wheel to the shaft or from the shaft to the gear wheel. At the input shaft 22 the torque is transmitted from the shaft 22 to the gear wheels 200, 201. When the freewheel 29 is disengaged, the outer part of the freewheel 29 must turn more quickly than the inner part, which is fastened to the shaft 22. Through the gear ratio change from 36 to 30 teeth from the input shaft 22 to the intermediate shaft 45 and from 36 to 30 teeth from the intermediate shaft 45 back to the input shaft 22, the gear wheel 201 turns more quickly than the input shaft 22. No torque is thus transmitted from the gear wheel 201 to the shaft 22. If the clutch 32 is disengaged, the gear wheels 200 and 201 try to come to a stop. The gear wheel 201 thus turns more slowly than the shaft 22 and the freewheel 29 engages. On the output shaft 93 the torque is transmitted in a reversed manner from the gear wheel to the shaft. Through the arrangement of the freewheel 102 on the gear wheel 204, the outer part of the freewheel 102 is to turn more slowly than the inner part fastened on the shaft 93. If the clutch 104 is engaged on the gear wheel 205, the torque is transmitted from the intermediate shaft 45 to the output shaft 93 with a gear ratio change from 36 to 11 teeth. The gear wheel 204 is driven by the intermediate shaft 45 in the ratio 17:30 and thus turns more slowly than the output shaft 93. No torque is thus transmitted from the intermediate shaft 45 to the driven shaft 93 via the gear wheel 204. The freewheel 102 is disengaged. If the clutch 104 is disengaged, the shaft 93 tries to come to a stop, and the torque is then automatically transmitted via the freewheel 102, as the gear wheel 204 now turns more quickly than the shaft 93. The clutch means 29, 32; 102, 104 are arranged inside the transmission (seen in the direction of travel F) to the left of the gear wheel 200, 201, 204, 205, so that the control of the clutches 32, 104 can take place from an outside of the housing H. Attention must be paid to the fact that possibly more than one clutch must be operated simultaneously with the shifting processes. As a result, a simultaneous engaging or disengaging is necessary.

The following four gears result from this arrangement of the gear wheels 200, 201, 202, 203, 204, 205:

$1^{st}$ Gear

Both clutches 32, 104 are disengaged and both freewheels 32, 102 transmit the torque to the intermediate shaft 45 via the gear wheels 201, 203 and from there to the output shaft 93 via the gear wheels 202, 204. The gear ratio step-up is 1.47.

$2^{nd}$ Gear

The clutch 32 on the input shaft 22 is engaged and the clutch 104 on the output shaft 93 is disengaged. The torque is transmitted to the intermediate shaft 45 via the gear wheels 200, 202 and from there to the output shaft 93 via the gear wheels 202, 204. This results in a gear ratio step-up of 2.12.

3$^{rd}$ Gear

The clutch 32 on the input shaft 22 is disengaged and the clutch 104 on the output shaft 93 is engaged. The torque is transmitted to the intermediate shaft 45 via the gear wheels 201, 203 and from there to the output shaft via the gear wheels 203, 205. The gear ratio step-up is 2.73.

4$^{th}$ Gear

Both clutches 32, 104 are engaged. The torque is transmitted to the intermediate shaft 45 via the gear wheels 200, 202 and from there to the output shaft 93 via the gear wheels 203, 205. The gear ratio step-up is 3.93.

This 4-gear transmission offers a good range of gear ratios. The individual gradings between the gears, however, are very rough and thus suitable only for very simple types of bicycles. An extended 4-gear transmission lends itself to achieving a higher number of gears with an equal range of gear ratios and thus a finer grading. One option for realizing this is to connect in series two identically structured 4-gear transmissions, which results in 16 theoretically possible shifting combinations. In order to prevent the bicycle rider from feeling any large differences in pedaling frequency between adjacent gears, which can lead to a loss in riding comfort and acceleration capacity, the 16 gears must be chosen expediently in terms of their size and grading. The gear ratio steps between the individual gears should be not too large and relatively even. The gear ratio range should correspond approximately to that of commercially available derailleur gears.

A 16-gear transmission is explained with the aid of FIG. 19, the 16 possible gears of which transmission, however, result in only 15 expedient ones, so that it is better to speak of a 15-gear transmission. The arrangement of the freewheels and clutches in this second exemplary embodiment is identical to the one shown in FIG. 18. Identical components or those acting in the same way thus bear the same reference numbers. The transmission is shifted via four clutches 32, 69, 70, 104 and four freewheels 29, 83, 84, 102. The gear wheels 202, 203 and 40, 401 of the intermediate shafts 44 and 45 are embodied in one piece with the shafts.

The gears are realized as follows:

1$^{st}$ Gear

The clutches 32, 69, 70 and 103 are all disengaged. The torque runs from the gear wheel 201 to the gear wheel 203, then from the gear wheel 202 to the gear wheel 79, to the intermediate shaft 62 and from here to the gear wheel 41 of the intermediate shaft 44 via the gear wheel 80, and here to the gear wheel 204 of the output shaft via the gear wheel 40. This results in a gear ratio of 0.47.

2$^{nd}$ Gear

The clutch 32 is engaged, the clutch 69 is disengaged, the clutch 70 is disengaged and the clutch 104 is disengaged. The torque runs from the gear wheel 200 to the gear wheel 202 of the intermediate shaft 45, from here to the gear wheel 79 of the intermediate shaft 42 via the gear wheel 202 and to the gear wheel 41 of the intermediate shaft 44 via the gear wheel 80, and from here to the gear wheel 31 of the output shaft 93 via the gear wheel 40. This results in a gear ratio of 0.67.

3$^{rd}$ Gear

In 3$^{rd}$ gear the clutch 32 is disengaged, the clutch 69 is engaged, the clutch 70 is disengaged and the clutch 104 is engaged. The torque runs from the gear wheel 201 to the gear wheel 203 of the intermediate shaft 45, from here to the gear wheel 71 of the intermediate shaft 62, then to the intermediate shaft 44 via the gear wheels 80 and 41, and from here to the output shaft 93 via the gear wheels 40, 204. This results in a gear ratio of 0.77.

4$^{th}$ Gear

In 4$^{th}$ gear the clutch 32 is disengaged, the clutch 69 is disengaged, the clutch 70 is disengaged and the clutch 104 is engaged. The torque runs from the gear wheel 201 to the gear wheel 203 of the intermediate shaft 45, from here to the gear wheel 79 of the intermediate shaft 62 via the gear wheel 42, then to the intermediate shaft 44 via the gear wheels 80, 41, and from here to the output shaft 93 via the gear wheels 41, 205. This results in a gear ratio of 0.88.

5$^{th}$ Gear

In 5$^{th}$ gear the clutches 32 and 69 are disengaged, the clutch 70 is engaged and the clutch 104 is disengaged. The torque runs to the intermediate shaft 45 via the gear wheels 201, 203, then to the intermediate shaft 62 via the gear wheels 202, 79, from here to the intermediate shaft 44 via the gear wheels 72, 40, and then to the output shaft 93 via the gear wheels 40, 31. This results in a gear ratio of 0.99.

6$^{th}$ Gear

In 6$^{th}$ gear the clutches 201 and 69 are engaged, and the clutches 70 and 104 are disengaged. The torque runs to the intermediate shaft 45 via the gear wheels 200, 202, then to the intermediate shaft 62 via the gear wheels 203, 71, from here to the intermediate shaft 44 via the gear wheels 80, 41, and then to the output shaft 93 via the gear wheels 40, 204. This results in a gear ratio of 1.10.

7$^{th}$ Gear

In 7$^{th}$ gear the clutch 32 is engaged, the clutch 69 is disengaged, the clutch 70 is disengaged and the clutch 104 is engaged. The torque runs to the intermediate shaft 45 via the gear wheels 201, 203, from here to the intermediate shaft 32 via the gear wheels 202, 79, then to the intermediate shaft 44 via the gear wheels 80, 41, and from here to the output shaft 93 via the gear wheels 41, 205. This results in a gear ratio of 1.25.

8$^{th}$ Gear

In 8$^{th}$ gear the clutch 32 is disengaged, the clutch 69 is engaged, the clutch 70 is disengaged and the clutch 104 is engaged. The torque runs to the intermediate shaft 45 via the gear wheels 201, 203, from here to the intermediate shaft 62 via the gear wheels 203, 71, to the intermediate shaft 44 via the gear wheels 80, 41, and from here to the output shaft 93 via the gear wheels 41, 205. This results in a gear ratio of 1.44.

9$^{th}$ Gear

In 9$^{th}$ gear the clutch 32 is disengaged, the clutch 69 is engaged, the clutch 70 is engaged and the clutch 104 is disengaged. The torque runs to the intermediate shaft 45 via the gear wheels 200, 202, from here to the intermediate shaft 62 via the gear wheels 203, 71, then to the intermediate shaft 44 via the gear wheels 72, 40, and from here to the output shaft 93 via the gear wheels 40, 31. This results in a gear ratio of 1.63.

10$^{th}$ Gear

In 10$^{th}$ gear the clutch 29 is disengaged, the clutch 69 is disengaged, the clutch 70 is engaged and the clutch 205 is engaged. The torque runs to the intermediate shaft 45 via the gear wheels 201, 203, from here to the intermediate shaft 62 via the gear wheels 202, 79, then to the intermediate shaft 44 via the gear wheels 72, 40, and from here to the output shaft 93 via the gear wheels 41, 205. This results in a gear ratio of 1.84.

11$^{th}$ Gear

In 11$^{th}$ gear the clutch 32 is engaged, the clutch 69 is engaged, the clutch 70 is disengaged and the clutch 104 is engaged. The torque runs to the intermediate shaft 45 via the gear wheels 201, 203, then to the intermediate shaft 62 via the gear wheels 203, 71, from here to the intermediate shaft 44 via the gear wheels 80, 41, and then to the output shaft 93 via the gear wheels 41, 205. This results in a gear ratio of 2.06.

12$^{th}$ Gear

In 12$^{th}$ gear the clutch 32 is engaged, the clutch 69 is engaged, the clutch 70 is engaged and the clutch 205 is disengaged. The torque runs to the intermediate shaft 45 via the gear wheels 200, 202, then to the intermediate shaft 62 via the gear wheels 203, 71, from here to the intermediate shaft 44 via the gear wheels 72, 40, and then to the output shaft 93 via the gear wheels 40, 31. This results in a gear ratio of 2.32.

13$^{th}$ Gear

In 13$^{th}$ gear the clutch 32 is engaged, the clutch 69 is disengaged, the clutch 70 is engaged and the clutch 104 is engaged. The torque runs to the intermediate shaft 45 via the gear wheels 200, 202, then to the intermediate shaft 62 via the gear wheels 202, 79, from here to the intermediate shaft 44 via the gear wheels 72, 40, and then to the output shaft 93 via the gear wheels 41, 205. The gear ratio is 2.63.

14$^{th}$ Gear

In 14$^{th}$ gear the clutch 32 is disengaged, the clutch 69 is engaged, the clutch 70 is engaged and the clutch 104 is engaged. The torque runs to the intermediate shaft 45 via the gear wheels 201, 203, from here to the intermediate shaft 62 via the gear wheels 203, 71, then to the intermediate shaft 44 via the gear wheels 72, 40, and from here to the output shaft 93 via the gear wheels 40, 31. This results in a gear ratio of 3.30.

15$^{th}$ Gear

In 15$^{th}$ gear all the clutches 32, 69, 70, 104 are engaged. The torque runs to the intermediate shaft 45 via the gear wheels 200, 202, then to the intermediate shaft 62 via the gear wheels 203, 71, from here to the intermediate shaft 44 via the gear wheels 72, 40, and finally to the output shaft 93 via the gear wheels 41, 205. This results in a gear ratio of 4.32.

In principle, the torque is always transmitted via the freewheel of the partner gear wheel when a clutch is disengaged. In order to achieve an expedient gear ratio range, the gear ratios must be further increased in the embodiments previously described. This is carried out through the gear ratio from drive sprocket 111 to sprocket 63 on the rear wheel HR. In a preferred embodiment the drive sprocket 111, 22 and the sprocket 63 on the rear wheel HR have 16 teeth, which results in a gear ratio with the factor 1.375. The total gear ratio now generated with its steps can be seen in the following table:

| | | |
|---|---|---|
| 3$^{rd}$ | 1.06 | 13.33% |
| 4$^{th}$ | 1.21 | 12.50% |
| 5$^{th}$ | 1.36 | 11.79% |
| 6$^{th}$ | 1.52 | 13.33% |
| 7$^{th}$ | 1.72 | 15.56% |
| 8$^{th}$ | 1.99 | 12.50% |
| 9$^{th}$ | 2.23 | 13.33% |
| 10$^{th}$ | 2.53 | 11.79% |
| 11$^{th}$ | 2.83 | 12.50% |
| 12$^{th}$ | 3.18 | 13.33% |
| 13$^{th}$ | 3.61 | 15.56% |
| 14$^{th}$ | 4.17 | 42.53% |
| 15$^{th}$ | 5.94 | |
| Total | | 645.65% |

The steps are calculated as follows:

N is any gear between 1 and 14. The gear ratio of the gear N+1 is divided by the gear ratio of the gear N. 1 is subtracted from the quotient, and the result is multiplied by 100. The result is the step between the gears N and N+1 in %. The total gear ratio is calculated from the quotient of the last and the first gear.

Figure 3B:
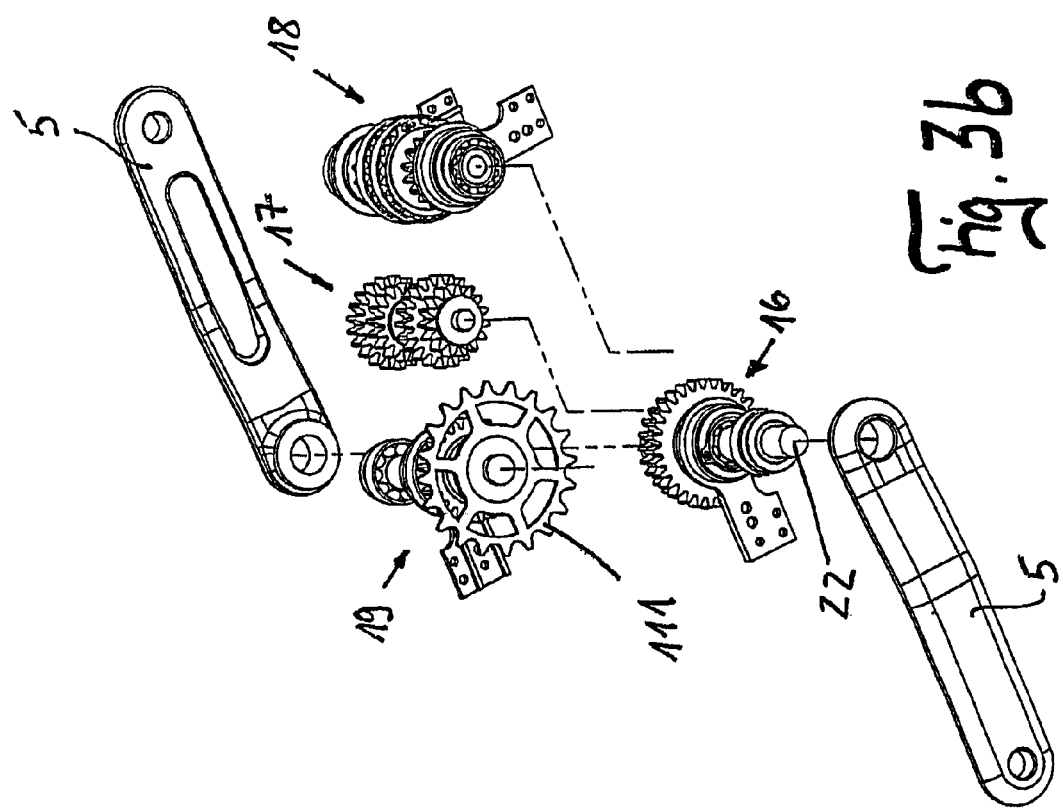
FIG. 3b shows various assemblies of the multiple gear transmission in their arrangement in exploded view.
Figure 3A:
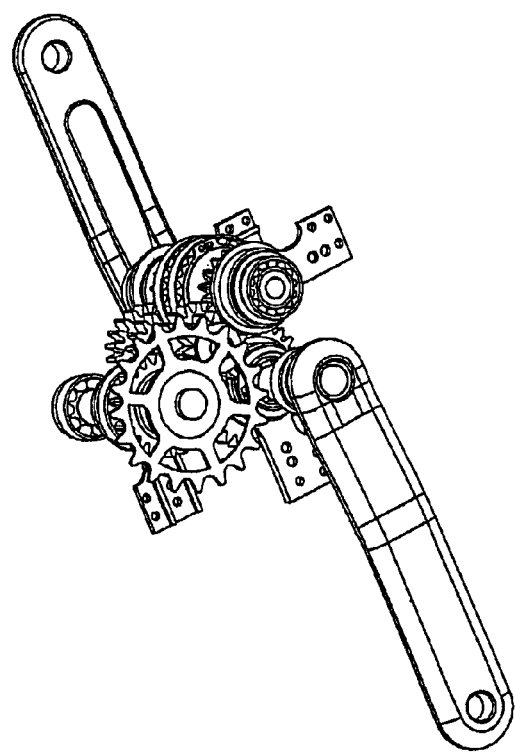
FIG. 3a shows various assemblies of the multiple gear transmission in their arrangement in perspective view.

The structure of the transmission is described in more detail below:

FIG. 3 shows only the four shaft assemblies, the pedal cranks 5 and their position within the housing. The bottom bracket shaft assembly 16 with the input shaft 22 is connected to the pedal cranks 5; the torque is introduced into the transmission via the input shaft.

The central shaft assembly 17 with the intermediate shafts 45 and 44 (not visible here) serves to transmit the torque. Via the central shaft assembly 17 the torque is transmitted from the bottom bracket shaft assembly 16 to the connecting shaft assembly 18, which in turn transmits the torque back to the central shaft assembly 17, which passes on the torque to the driven shaft assembly 19.

The bottom bracket shaft assembly 16 shown in FIGS. 4a and 4b is supported in the housing parts 9 and 10 (FIG. 10) via the ball bearings 20, 21. These are located on the input shaft 22. The sealing is carried out via two radial shaft seal rings 25, 26 located on the adapter sleeves 23, 24. In order to connect the gear wheels 27, 28 to the bottom bracket shaft 22 in a torque-proof manner, the gear wheel 201 is connected to the freewheel 29. The inner part of the freewheel 29 is connected to the input shaft 22 in a torque-proof manner. The outer part is connected to the gear wheel 201 in a torque-proof manner. The gear wheel 27 is connected to a clutch 30 in a fixed manner and supported on the input shaft 22 via the needle roller bearing 31. In order to be able to produce a torque-proof connection between the input shaft 22 and the gear wheel 200, the clutch 32 is attached to the input shaft 22 in a torque-proof, but axially displaceable manner. A thrust washer 33 is located between the freewheel 29 and the clutch 32. In order to ensure an independent turning of the two gear wheels 200 and 201, a shim ring 34 and an axial needle roller bearing 35 with two thrust washers 36 and 37 are placed between them. In order to ensure an independent working of the freewheel 29 and the ball bearing 20, a thrust washer 38 is also placed between them.

Figure 5B:
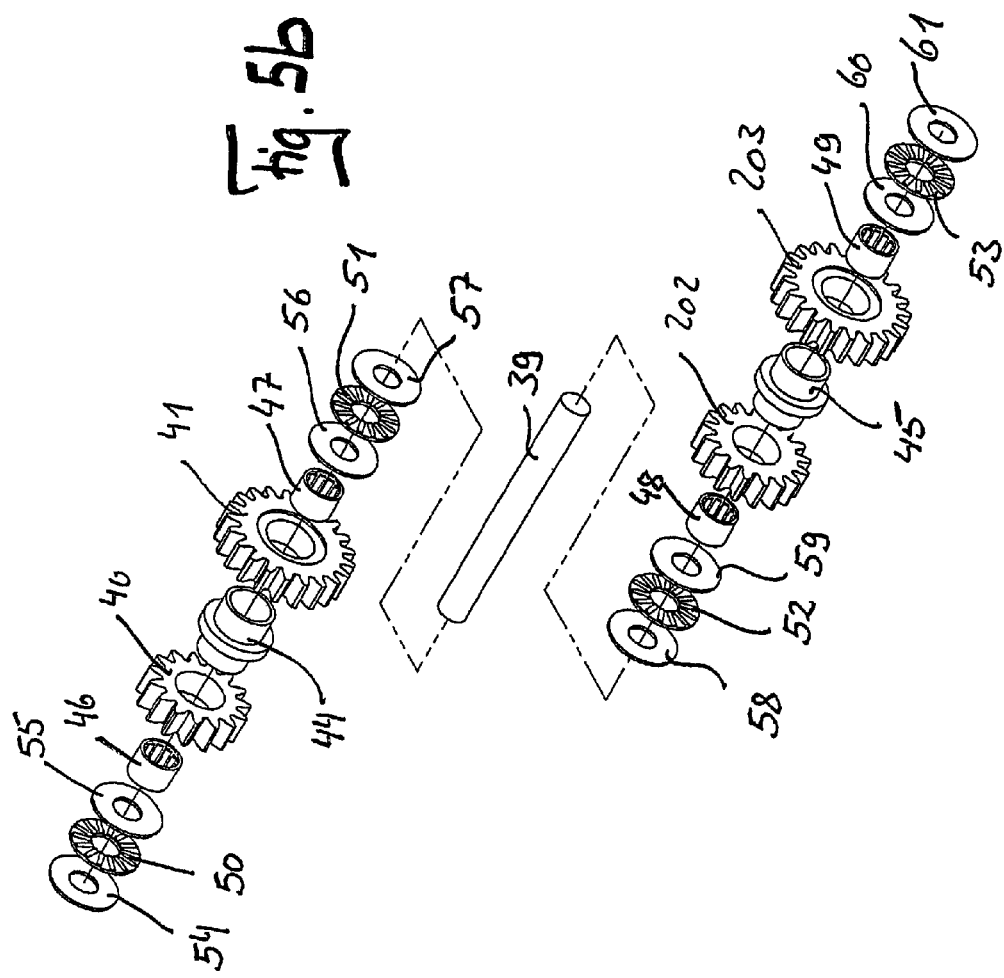
FIG. 5b shows a central shaft assembly in exploded view.
Figure 5A:
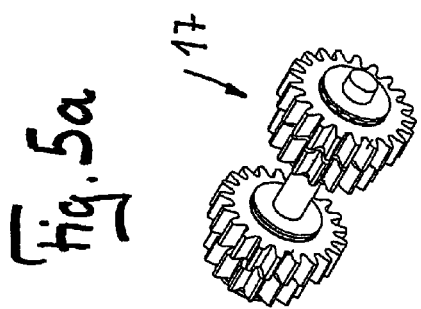
FIG. 5a shows a central shaft assembly in perspective view.

FIG. 5b shows the central shaft assembly 17. The central shaft 39 is fastened in a stiff manner in the housing parts 9, 10 and 11. A total of four gear wheels 40, 41, 202 and 203 are located on this central shaft 39, respectively two of which are attached in a torque-proof manner to a connecting piece 44 and 45. The connecting pieces 44 and 45 are supported on the central shaft 39 via the needle roller bearings 46, 47, 48 and 49. Respectively one axial needle roller bearing 50, 51, 52, 53 with respectively two thrust washers 54, 55, 56, 57, 58, 59, 60, 61 are located at the side of the gear wheels towards the housing clampings.

FIG. 6b shows the structure of the connecting shaft assembly 18. Two shaft parts 63, 64 are inserted in a fixed manner in a shaft connecting piece 61, at the ends of which shaft parts respectively one clutch shaft component 65, 66 is attached in a fixed manner. For serial production, a component is conceivable here that unites the components 61, 63, 64, 65, 66 in one component (62). The clutch shaft components 65, 66 have an external toothing. Respectively one ball bearing 67, 68 is attached on the outer piece of the clutch shaft components 65, 66, which ball bearing is supported in the housing parts 9 and 10. Respectively one clutch 69, 70 is located on each clutch shaft component 65 and 66. The gear wheels 71, 72 are attached in a fixed manner to the clutch elements 73, 74, which are supported on the shaft parts 63 and 64 via the needle roller bearings 75, 76. The clutches 69, 70 are embodied to be torque-proof and axially displaceable on the clutch shaft components 65, 66, in order to be able to produce a torque-proof connection between the clutch shaft components 65, 66 and the gear wheels 71, 72. Respectively one thrust washer 77, 78 is located between the clutch elements 73, 74 and the clutches 69, 70. The gear wheels 79, 80 are connected to the freewheel 83, 84 via respectively one connecting element 81, 82. The outer part of the freewheels 83, 84 is respectively connected in a torque-proof manner to the connecting element 81, 82. The inner part is respectively connected in a torque-proof manner to the shaft connecting piece 61. The gear wheels 79, 80 are supported on the needle roller bearings 85, 86 via the connecting elements 81, 82. Respectively one ball bearing 87, 88 is located on the connecting elements 81, 82, which ball bearing is axially secured by respectively two snap rings 89, 90, 91, 92. The connecting shaft assembly is supported in the housing part 11 by the bearings 87, 88.

FIGS. 7a, 7b show the driven shaft assembly 19. Analogically to the bottom bracket shaft assembly 16, the output shaft 93 is supported in the housing parts 9, 10 via two ball bearings 94, 95 and sealed towards the outside with two radial shaft seal rings 98, 99 located on adapter sleeves 96, 97. In order to connect the gear wheels 204, 205 in a torque-proof manner to the output shaft 93, the gear wheel 204 is connected to the freewheel 102. The inner part of the freewheel 102 is connected in a torque-proof manner to the bottom bracket shaft 93. The outer part is connected in a torque-proof manner to the gear wheel 204. The gear wheel 205 is connected in a fixed manner to a clutch 103. In order to be able to produce a torque-proof connection between the shaft 93 and the gear wheel 205, the clutch 104 is attached to the output shaft 93 in a torque-proof, but axially displaceable manner. The clutch component part 103 and the gear wheel 205 are supported on the output shaft 93 via the needle roller bearing 105. A thrust washer 106 is located between the clutch assembly 104 and the clutch component part 103. In order to ensure an independent turning of the two gear wheels 204, 205, an axial needle roller bearing 107 with two thrust washers 108, 109 is placed between them. In order to ensure an independent working of the freewheel 102 and the bearing 95, a thrust washer 110 is also placed between them. For the output, a sprocket 11 is attached in a torque-proof manner to the shaft 93 outside the housing H via a sprocket holder 112.

FIG. 8 shows an embodiment of a clutch assembly 32. A coupling element 114 to the selector finger assembly 121 (not shown here) is attached to a clutch component part 113. This coupling element 114 is supported with two axial bearings 115, 116 to ensure a turning with as free of losses as possible. The arrangement is axially secured against slipping with a snap ring 117.

Figure 9:
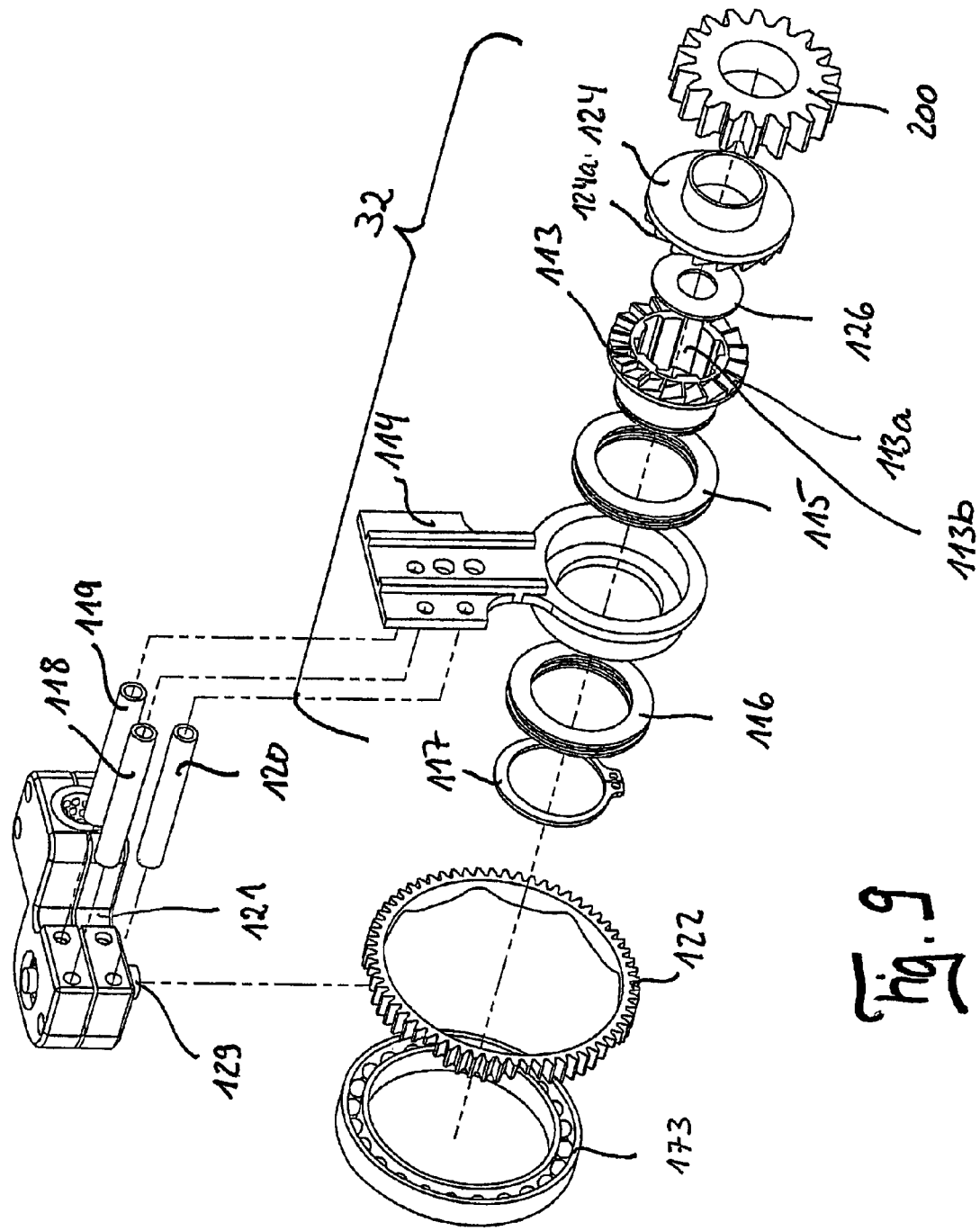
FIG. 9 shows a selector finger assembly in exploded view.

FIG. 9 shows the mechanical control of a clutch assembly. The clutch assembly is connected in a fixed manner to a selector finger assembly 121 via coupling elements 118, 119, 120. This selector finger assembly 121 runs on a shifting gate body 122 provided with an external toothing, which body is supported on a ball bearing 173. A clutch component part 124 is located opposite the clutch component part 113, on which clutch component part 124 a gear wheel 200 is attached. A thrust washer 126 is located between the clutch component part 124 and the clutch component part 113, the components 116, 117, 114, 115, 113, 124 together form the clutch 32.

Figure 10:
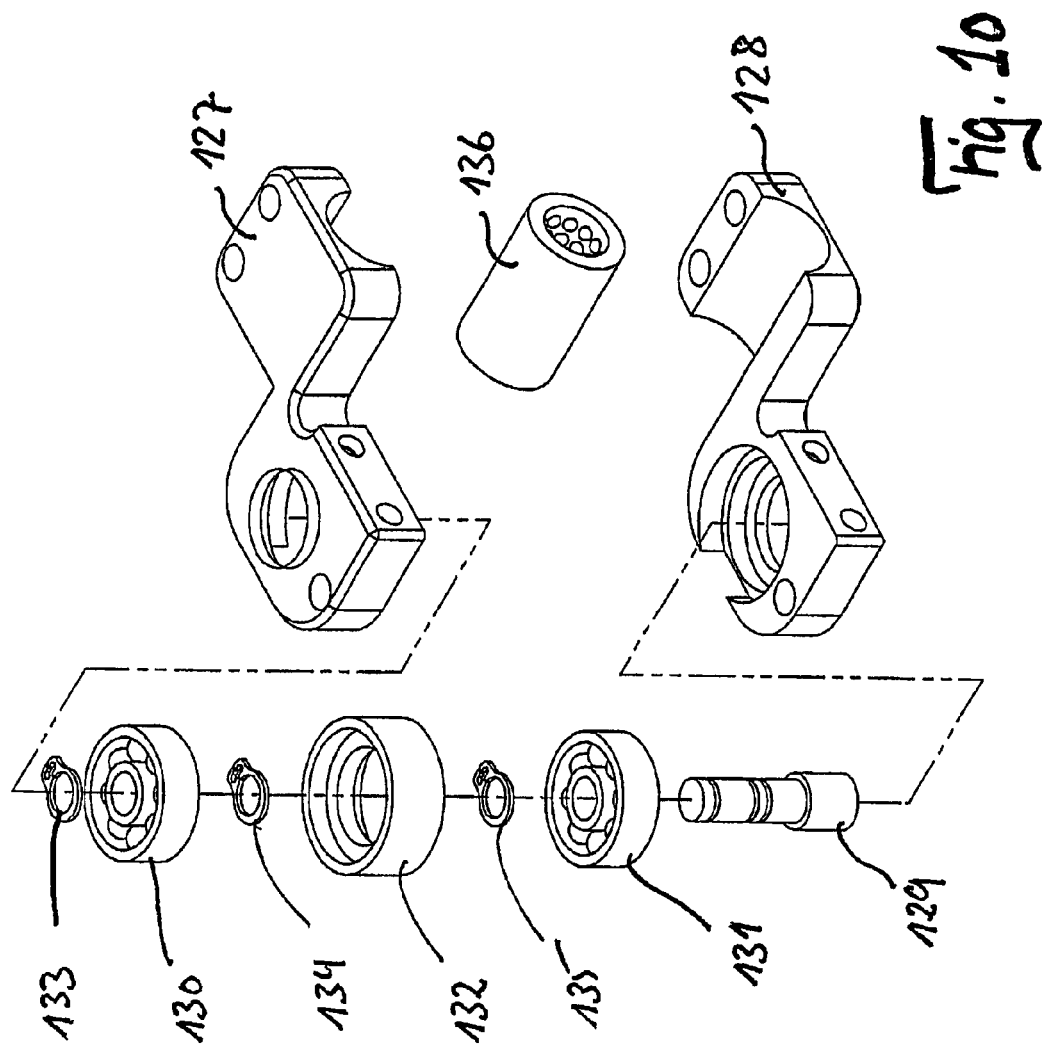
FIG. 10 shows a mechanical control unit of the clutch assembly according to FIG. 8.
Figure 11:
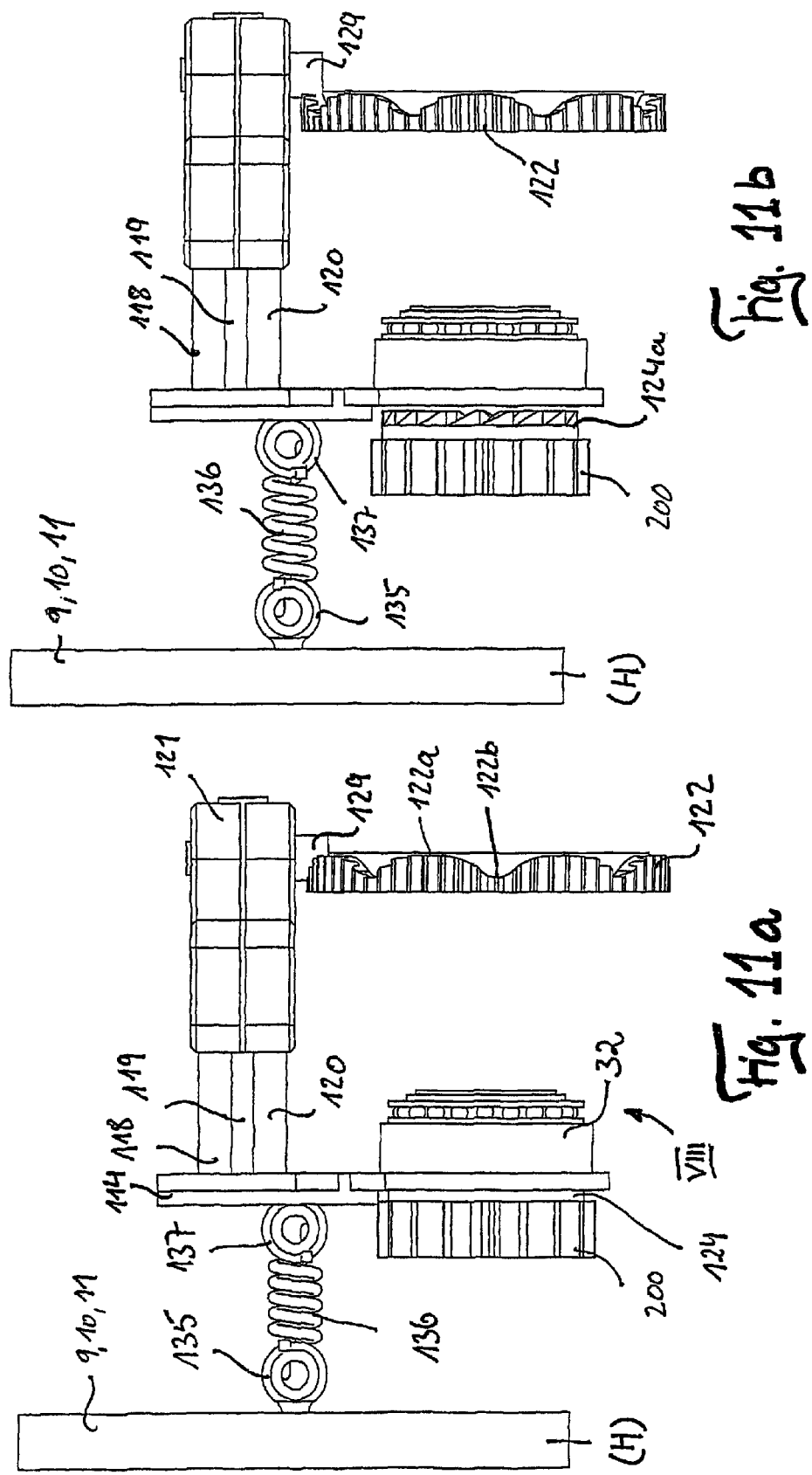
FIG. 11a shows a first clutch position engaged.
FIG. 11b shows a second clutch position disengaged.

FIGS. 10 and 11 show the selector finger assembly 121. A selector finger assembly is composed of the two selector finger housings 127, 128, in which a selector finger 129 is supported via two ball bearings 130, 131. The bearings 130, 131 are located in a connecting component 132. The selector finger 129 is secured against slipping with three snap rings 133, 134, 135. Furthermore, a linear ball bearing 136 is located between the finger housings 127, 128. The selector finger 129 of the selector finger assembly 114 runs on a shifting gate body 122. The selector finger assembly 114 is connected to the clutch assembly according to FIG. 8 via coupling elements 118, 119, 120. The selector finger 129 is drawn against the shifting gate body 122 undulated on the front side via the coupling elements 118, 119, 120, the clutch assembly and a tension spring 136. The tension spring 136 is connected to the coupling element 114 of the clutch assembly via an eyebolt 137 and to a housing part 9, 10, 11 via another eyebolt 135. The gear wheel 200 attached to the clutch component part 124 is located concentrically to the clutch component 113. The position of the selector finger 129 on the front side of the shifting gate body 122 (wave peak or wave trough) determines whether the clutch 32 is engaged or disengaged. The tension spring 136 keeps the clutch 32 engaged.

Figure 12:
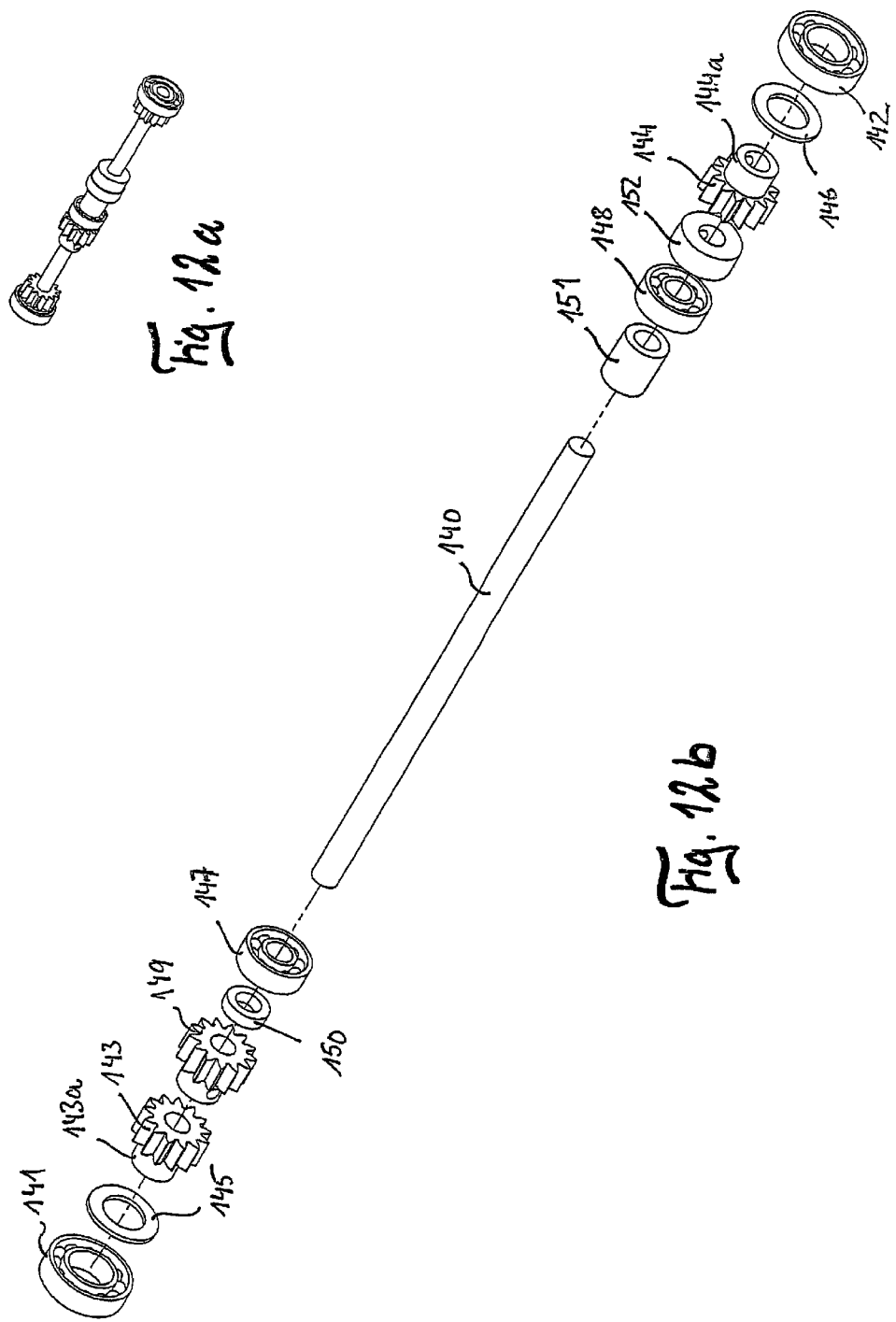
FIG. 12a shows a structure of the connecting shaft assembly in perspective view.
FIG. 12b shows a structure of the connecting shaft assembly in exploded view.

FIG. 12 shows the structure of a connecting shaft assembly. The connecting shaft 140 is supported in the housing parts 12, 13 via two ball bearings 141, 142. The bearings 141, 142 run on two gear wheels 143, 144 with hub 143a and 144a against respectively one thrust washer 145, 146. Two further ball bearings 147, 148 are attached centrally to the connecting axis 140 in the housing part 11. The bearings are secured against slipping via another gear wheel 149, two adapter sleeves 150, 151 and an adjusting collar 152.

Figure 13:
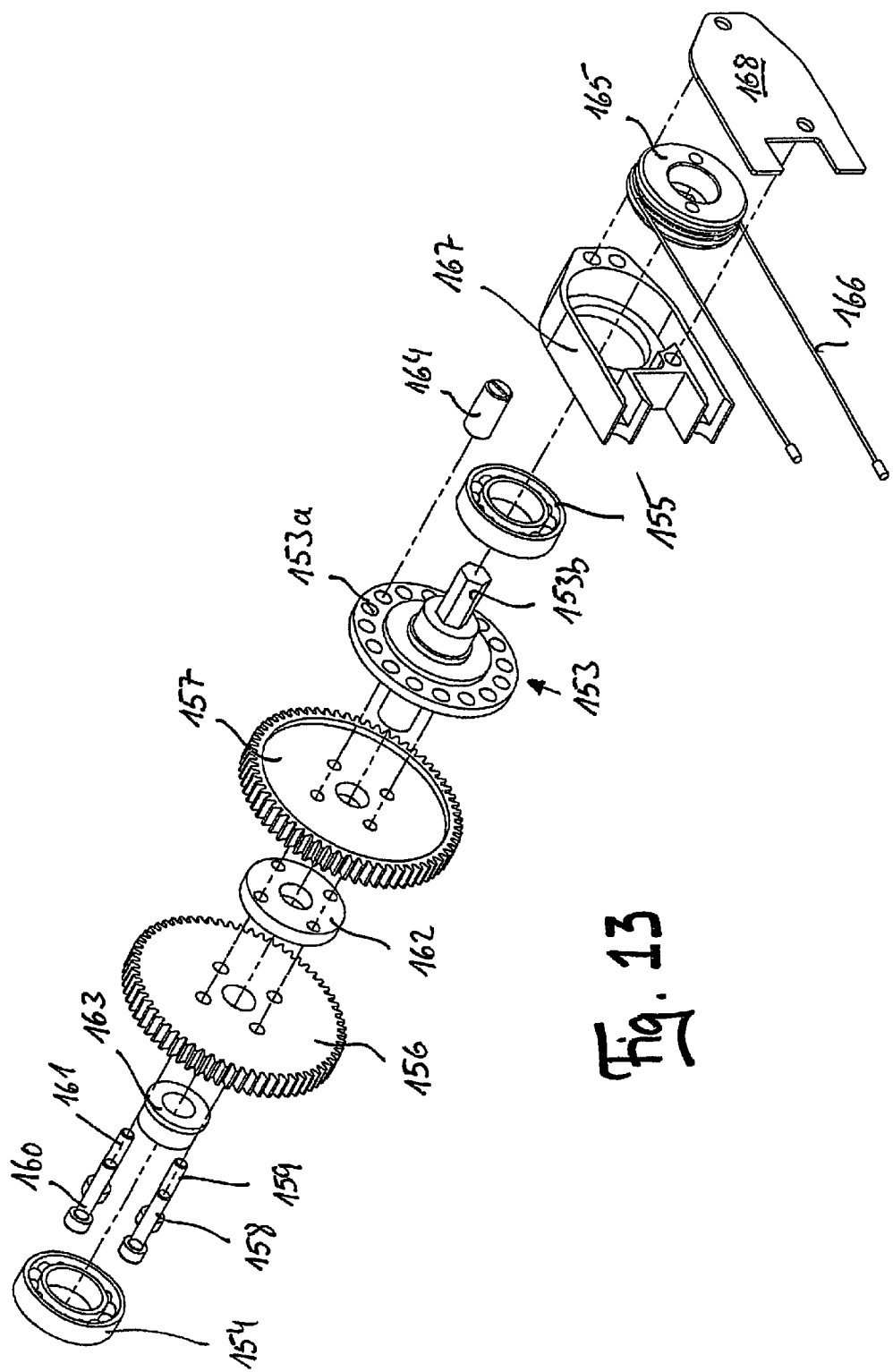
FIG. 13 shows a structure of the main shifting axis assembly in perspective view.

FIG. 13 shows the structure of the shifting control assembly. The shifting control shaft 153 embodied in a flange-like manner has several recesses 153a and a hexagonal piece 153b on its front side. It is supported in the housing parts 9, 12 via the ball bearings 154, 155. Two gear wheels 156, 157 are fastened to the shifting control shaft 153 by means of four screws 158, 159, 160, 161 and kept at a distance with a spacer washer 162. The ball bearing 154 is attached to the shifting control shaft 153 via a spacer sleeve 163. An index thrust piece 164 runs on the shifting control shaft 153 via the recesses. The cable drum 165 is located on the hexagonal piece (153b) of the shifting control shaft 153. This cable drum serves to hold the shift cable 166 and to pass on the shifting impulse. The cable drum 165 is located in a housing composed of a selector housing 167 and a selector housing cover 168.

Figure 14:
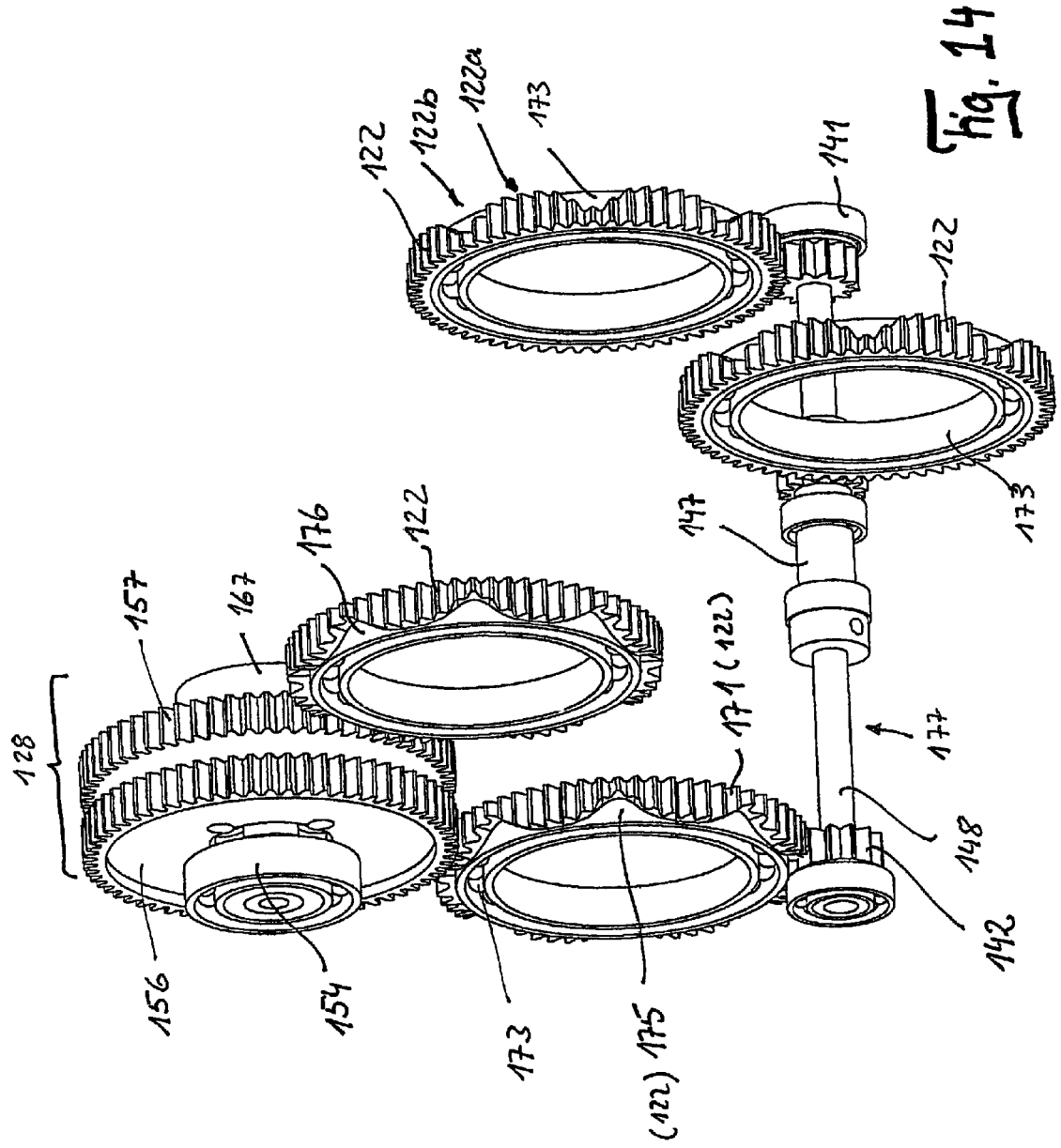
FIG. 14 shows an arrangement of the shifting gate body according to FIG. 11 and its control via the connecting shaft assembly according to FIG. 12 and the main shifting axis assembly according to FIG. 13.

FIG. 14 shows the combination of the shifting gate bodies 122, their ball bearings 173, the connecting shaft assembly 177 according to FIG. 12, and the shifting control assembly 128 according to FIG. 13. The rotational angle position of the individual shifting gate bodies to one another can be adjusted via clamping elements (not shown).

Figure 15:
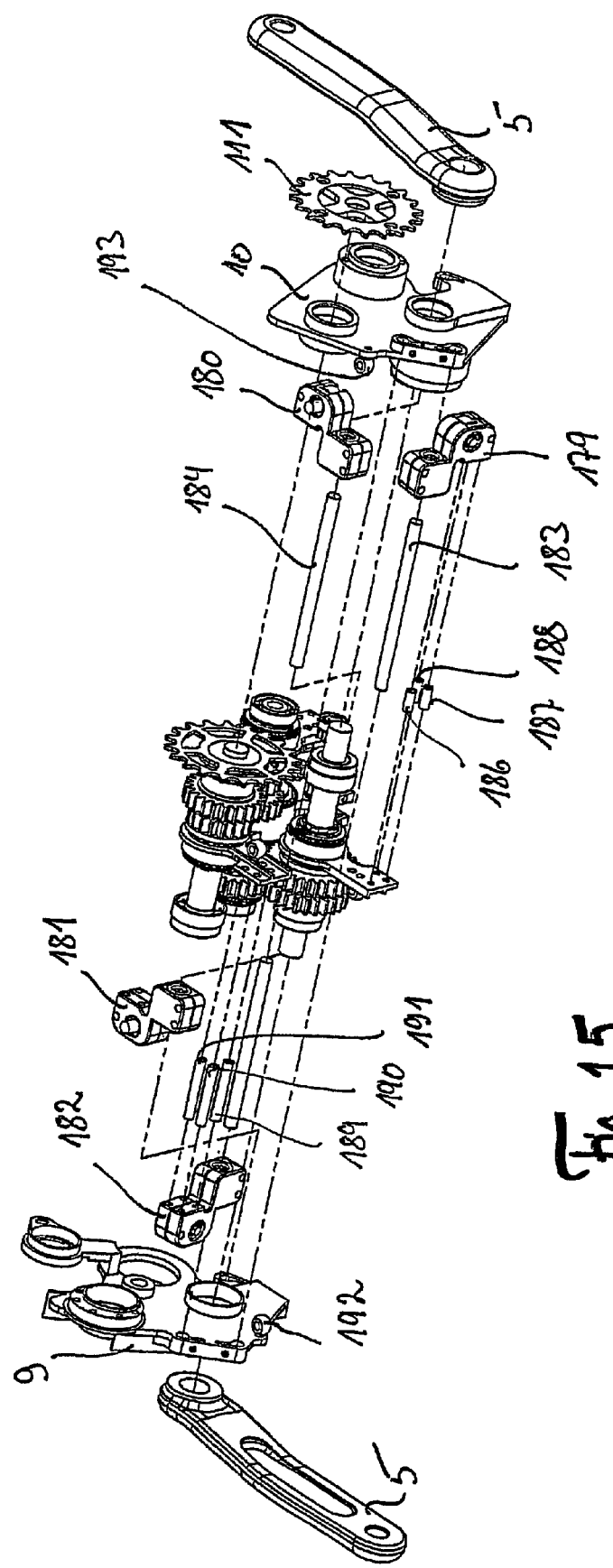
FIG. 15 shows a position of the selector finger assemblies according to FIG. 9 and the control unit according to FIG. 10 and their guiding axes within the housing in exploded view.

FIG. 15 shows the structure and positioning of the selector finger assemblies 179, 180, 181, 182 and their selector finger axes 183, 184, 185 in the transmission. Furthermore, the coupling elements 186, 187, 188, 189, 190, 191 are shown here as well. By way of example, the eyebolts 192, 193 fastened to the housing parts 9, 10 are shown.

Through the rotation of the shifting control assembly 128 all the shifting gate bodies 122 turn simultaneously. The state of the individual clutches 32, 69, 70, 104 is determined by the relative arrangement of the wave troughs 122b to the wave peaks 122a, which every selector finger 129 follows.

Figure 16:
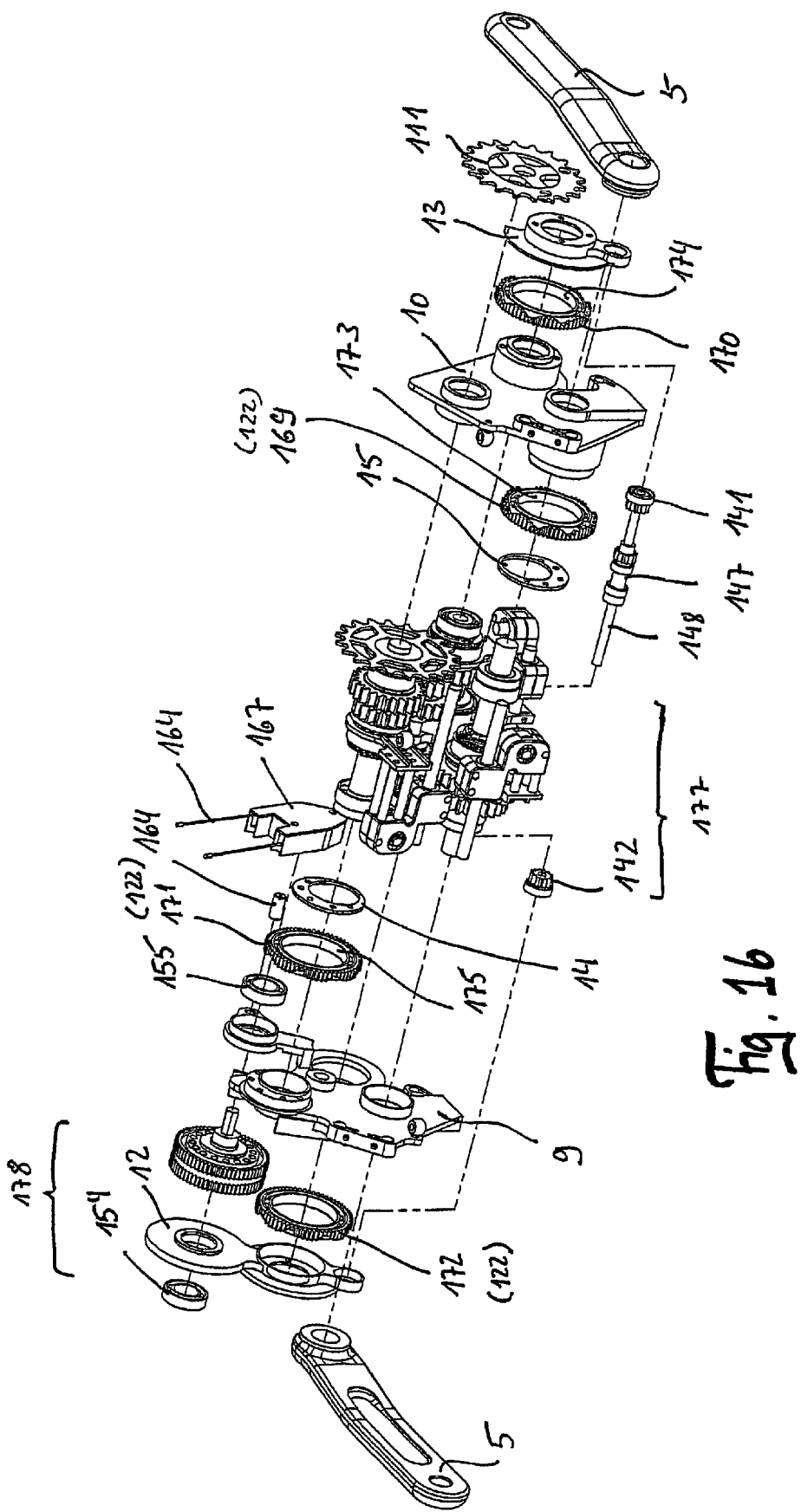
FIG. 16 shows a positioning of the shifting gate body according to FIG. 10, the connecting shaft assembly according to FIG. 12 and the main shifting axis assembly according to FIG. 13 in exploded view.

FIG. 16 shows the structure and positioning of the parts shown in FIG. 14 in the transmission. The shifting gate bodies 171, 172 are supported on the housing part 9 via the bearings 175, 176 and are secured axially with the housing parts 12, 14. The shifting control assembly 178 according to FIG. 13 is supported in the housing parts 12, 14 via the bearings 154, 155. The cable drum assembly 194 is fastened at the side of the shifting control assembly 178. The shifting gate bodies 169, 170 are supported on the housing part 10 via the bearings 173, 174 and secured axially by the housing parts 13, 15. The connecting shaft assembly 177 lies in the housing part 11 via the bearings 148, 147 and in the housing parts 12, 13 via the bearings 141, 142.

Figure 17:
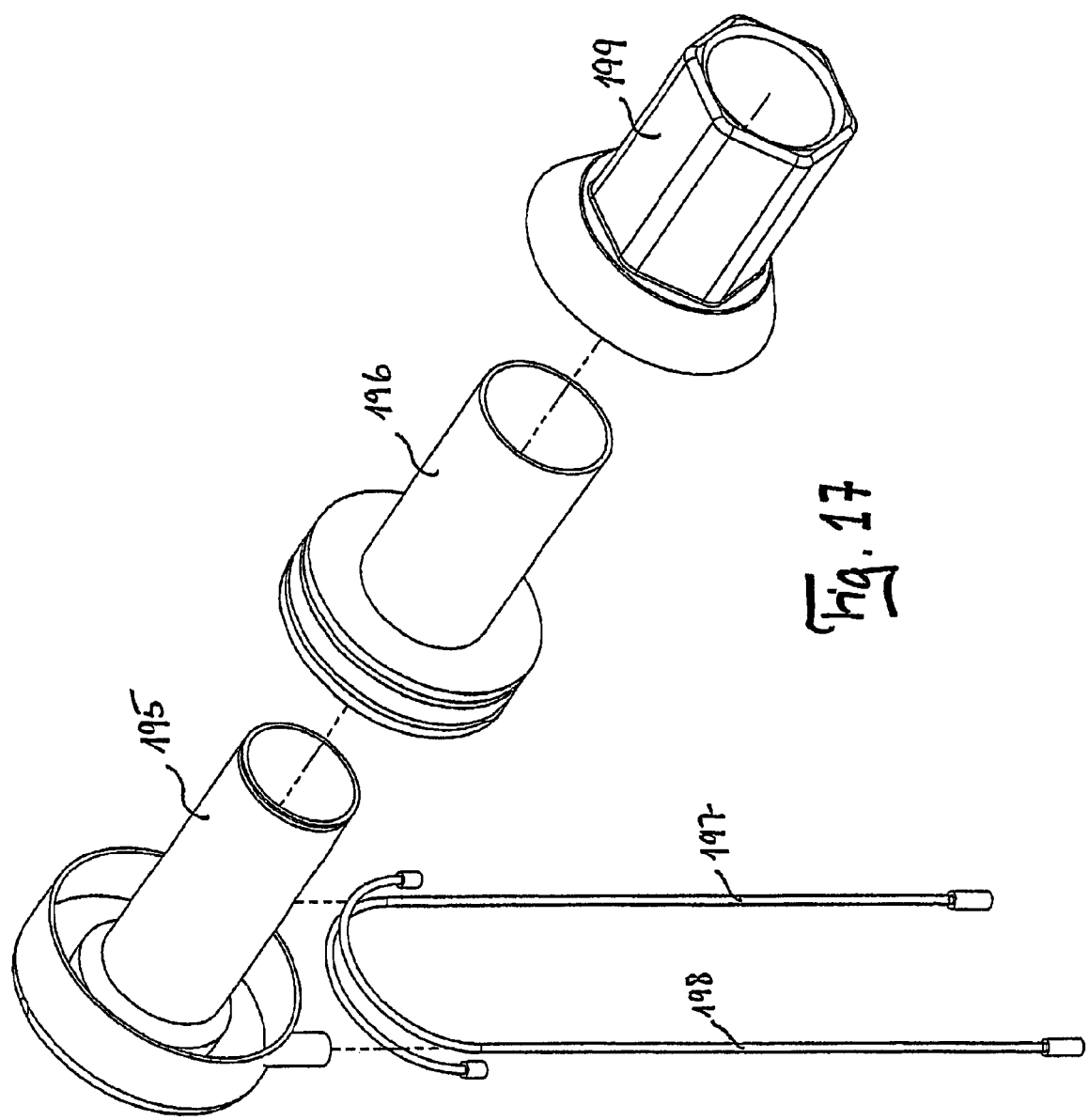
FIG. 17 shows a shifting rotary handle in exploded view.

FIG. 17 represents an exemplary embodiment of a rotary shifting handle assembly. This assembly comprises a shifting handle interior part 195, which can be fastened in a fixed manner to the handlebar 18, a shifting handle rotary body 196, into which the control cables 197, 198 are inserted, and a shifting handle rubber handle part 199.

The invention claimed is:

1. A multiple gear transmission for a bicycle comprising:
   an input shaft and an output shaft supported in a transmission housing, the input shaft being embodied to receive pedal cranks and both ends of the input shaft protrude from the transmission housing, and one end of the output shaft protrudes from the transmission housing and the output shaft is embodied at an end to receive a drive sprocket;
   at least one intermediate shaft is being supported in the transmission housing parallel between the input shaft and the output shaft;
   at least two gear wheels being respectively are arranged on the input shaft, the at least one intermediate shaft and the output shaft;
   the at least two gear wheels can be connected in a torque-proof manner to the respective input shaft and output shaft via a clutch mechanism; and
   the at least two gear wheels being permanently meshed with another gear wheel.

2. The multiple gear transmission according to claim 1, wherein the clutch mechanism includes at least two clutch mechanisms which changes simultaneously during at least one shifting process.

3. The multiple gear transmission according to claim 1, wherein the gear wheels on the input shaft and the at least two gear wheels on the output shaft can be connected in a torque-proof manner.

4. The multiple gear transmission according to claim 1, wherein respectively one of the gear wheels is connected in a torque-proof manner to a respective input shaft and output shaft by a freewheel and the respectively other one of the gear wheels by a shiftable clutch.

5. The multiple gear transmission according to claim 1, wherein the at least one intermediate shafts include a majority of parallel intermediate shafts is supported in the transmission housing.

6. The multiple gear transmission according to claim 2, wherein the at least one intermediate shafts include three intermediate shafts.

7. The multiple gear transmission according to claim 1, wherein the gear wheels mesh directly with the at least two gear wheels of the input shaft and the output shaft and are fastened in a torque-proof manner on the intermediate shafts.

8. The multiple gear transmission according to claim 7, wherein the at least two gear wheels are embodied in one piece with the at least intermediate shafts.

9. The multiple gear transmission according to claim 1, wherein the input shaft, the at least one intermediate shaft and the output shaft are hollow.

10. The multiple gear transmission according to claim 1, wherein the clutch mechanism has an internal toothing and a spur gearing.

11. The multiple gear transmission according to claim 1, wherein the clutch mechanism is arranged on the input shaft and the output shaft in an axially displaceable manner.

12. The multiple gear transmission according to claim 1, wherein the clutch mechanism is connected to two bearings acting in an axial manner.

13. The multiple gear transmission according to claim 12, wherein two bearings acting in an axial manner of the clutch mechanism are connected to a selector finger in a fixed manner or via a spring.

14. The multiple gear transmission according to claim 13, wherein the selector finger of the clutch mechanism is in contact with a shifting gate.

15. The multiple gear transmission according to claim 13, wherein the selector finger of the clutch mechanism is supported in a rotatable manner.

16. The multiple gear transmission according to claim 13, wherein the selector finger is guided in an axial manner.

17. The multiple gear transmission according to claim 14, wherein the shifting gate is arranged on a rotatable, rotationally symmetrical shifting gate body.

18. The multiple gear transmission according to claim 17, wherein the shifting gate body has elevations and recesses on its front surface or circumferential surface.

19. The multiple gear transmission according to claim 17, wherein the rotational axis of the shifting gate body is arranged parallel or at a right angle to a rotational axes of the input, output and at least one intermediate shafts.

20. The multiple gear transmission according to claim 14, further comprising several shifting gates connected to one another in a rotatable manner.

21. The multiple gear transmission according to claim 20, wherein the several shifting gates are connected to one another via gear wheels.

22. The multiple gear transmission according to claim 20, wherein the several shifting gates are simultaneously connected to more than one clutch and simultaneously cause several axial movements.

23. The multiple gear transmission according to claim 13, wherein a position of the selector finger is variable with respect to the clutch mechanism during mounting.

24. The multiple gear transmission according to claim 17, wherein the shifting gate body is supported on the housing.

25. The multiple gear transmission according to claim 1, wherein at least A+1 gear wheels have a spur gearing, whereby A represents a number of shafts.

26. The multiple gear transmission according to claim 1, wherein at least the input, output and at least one intermediate shafts have an external toothing.

27. The multiple gear transmission according to claim 25, wherein the spur gearing has a sawtooth shape in contoured section.

28. The multiple gear transmission according to claim 1, wherein the clutch mechanism is held in an axial manner via a spring.

29. The multiple gear transmission according to claim 13, wherein the axial movement of the selector finger is guided via a linear ball bearing.

30. The multiple gear transmission according to claim 1, wherein the at least two gear wheels are embodied in several parts.

31. The multiple gear transmission according to claim 1, further comprising an overload protection arranged before a drive sprocket.

32. The multiple gear transmission according to claim 1, wherein the transmission housing (H) is embodied in three parts, and at least one housing part is connected to a bicycle frame in a rigid manner.

33. The multiple gear transmission according to claim 1, wherein a rotational axes of the at least input, at least one intermediate and output shafts lie in at least two different planes.

34. The multiple gear transmission according to claim 1, wherein the at least two gear wheels have a same rotational axis and are always connected to one another.

35. The multiple gear transmission according to claim 17, wherein a rotational movement of several shifting gate bodies is controlled via a separate connecting shaft.

36. The multiple gear transmission according to claim 17, wherein a rotational angle position of several shifting gate bodies to one another is adjusted via clamping components.

* * * * *